United States Patent [19]

Ersoz et al.

[11] Patent Number: 5,369,444
[45] Date of Patent: Nov. 29, 1994

[54] FIELD TYPE MATCHING SYSTEM

[75] Inventors: Nathaniel H. Ersoz, Brownsburg; Barth A. Canfield, Indianapolis, both of Ind.

[73] Assignee: Thomson Consumer Electronics, Indianapolis, Ind.

[21] Appl. No.: 938,047

[22] PCT Filed: May 29, 1991

[86] PCT No.: PCT/US91/03741
§ 371 Date: Nov. 12, 1992
§ 102(e) Date: Nov. 12, 1992

[87] PCT Pub. No.: WO91/19385
PCT Pub. Date: Dec. 12, 1991

[30] Foreign Application Priority Data

Jun. 1, 1990 [GB] United Kingdom ............. 9012326.6

[51] Int. Cl.⁵ .................. H04N 5/272; H04N 5/262; H04N 9/74; H04N 5/04
[52] U.S. Cl. .................. 348/598; 348/588; 348/526; 348/513; 348/567; 348/910
[58] Field of Search .................. 358/183, 152, 160, 22, 358/182, 149, 148, 140, 142; 348/588, 589, 584, 586, 590, 591, 598, 600, 571, 597, 513, 526, 525, 550, 512, 497, 565, 567, 500, 910, 441, 445, 447, 458; H04N 5/262, 9/74, 5/04, 5/272

[56] References Cited

U.S. PATENT DOCUMENTS

| | | | |
|---|---|---|---|
| 4,249,213 | 2/1981 | Imaide et al. | 358/183 |
| 4,724,487 | 2/1988 | Casey | 358/183 |
| 4,750,038 | 6/1988 | Welles et al. | 358/183 |
| 4,761,686 | 8/1988 | Willis | 358/160 |
| 4,796,089 | 1/1989 | Imai et al. | 358/183 |
| 4,811,103 | 3/1989 | Casey | 358/183 |
| 4,837,626 | 6/1989 | Nishiyama et al. | 358/183 |
| 4,839,728 | 6/1989 | Casey | 358/183 |
| 4,878,117 | 10/1989 | Ikehira et al. | 358/183 |
| 4,918,518 | 4/1990 | Phillips | 358/148 |
| 4,984,083 | 1/1991 | Okamoto et al. | 358/183 |
| 4,987,493 | 1/1991 | Canfield et al. | 358/183 |
| 5,021,887 | 6/1991 | Park | 358/183 |
| 5,025,496 | 6/1991 | Canfield | 358/153 |
| 5,111,297 | 5/1992 | Tsuji et al. | 358/183 |
| 5,208,660 | 5/1993 | Yoshida | 358/183 |
| 5,262,864 | 11/1993 | Saeger et al. | 358/183 |

FOREIGN PATENT DOCUMENTS 2187360 1/1987 United Kingdom .
9119390 12/1991 WIPO .................. H04N 7/01

Primary Examiner—James J. Groody
Assistant Examiner—Safet Metjahic
Attorney, Agent, or Firm—Joseph S. Tripoli; Joseph J. Laks; Harvey D. Fried

[57] ABSTRACT

First and second field type detectors for first and second video signals have outputs indicating whether the video signals have first or second field types. The first video signal is synchronized with the second video signal for a combined display by a synchronous field memory and an asynchronous multiple line memory. The field type of the second video signal is changed when necessary to match the field type of the first video signal to maintain interlace integrity in the combined display. A field type changing circuit, which controls the synchronizing, has a first mode of operation which delays writing a current field of the first field type by one horizontal line period, a second mode of operation which advances writing a current field of the second field type by one horizontal line period and a third mode of operation which maintains a current field type. A comparison of the field type of the second signal to the field type of the first signal results in an output signal indicating one of a plurality of comparison outcomes, wherein the first and second video signals have the same field type, wherein the first video signal has the first field type and the second video signal has the second field type and wherein the first video signal has the second field type and the second video signal ha the first field type. A plurality of selectable interlace correction signals are generated, each being appropriate for one of the plurality of comparison outcomes.

26 Claims, 16 Drawing Sheets

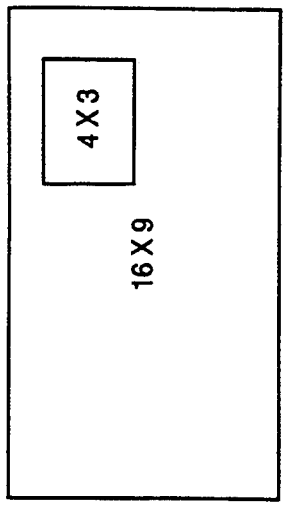
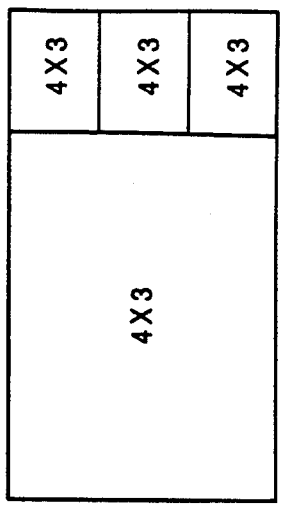
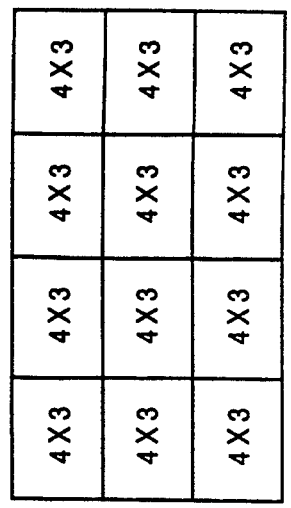
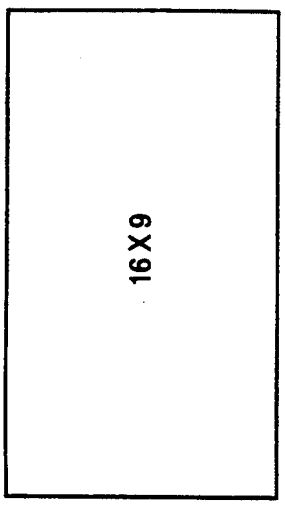
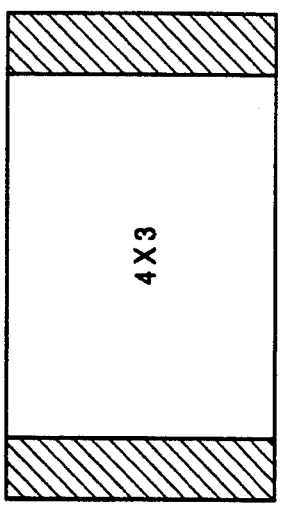
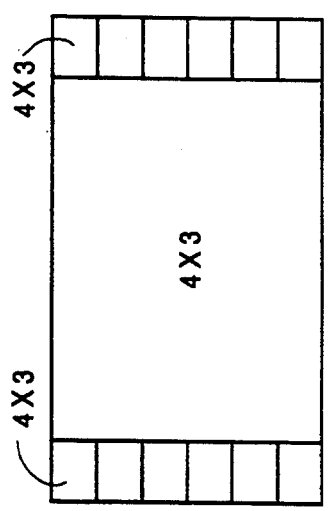
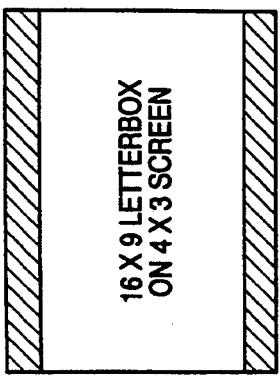
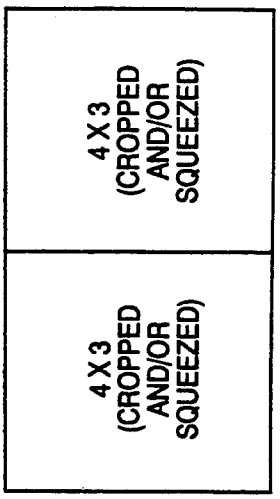
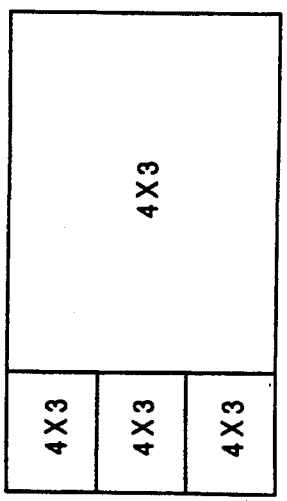

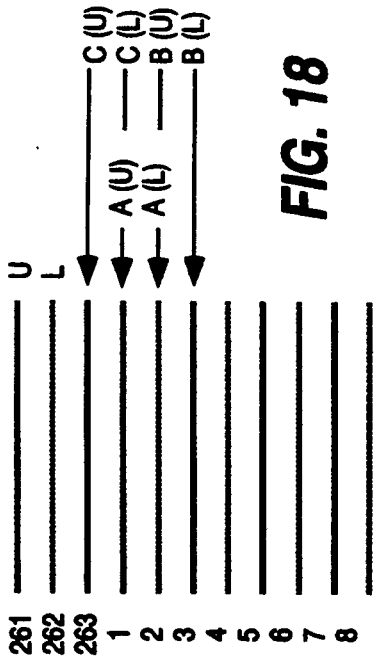
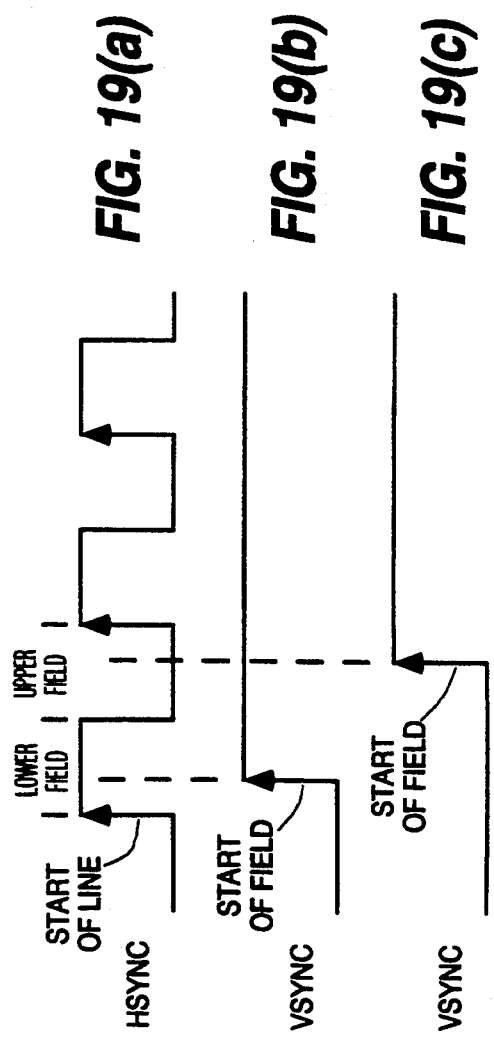
FIG. 17
FIG. 18
FIG. 19(a)
FIG. 19(b)
FIG. 19(c)

FIELD TYPE MATCHING SYSTEM

The invention relates to the field of televisions having multiple picture displays for asynchronous video signals, and in particular, to such televisions having a wide display format ratio screen. Most televisions today have a format display ratio, horizontal width to vertical height, of 4:3. A wide format display ratio corresponds more closely to the display format ratio of movies, for example 16:9. The invention is applicable to both direct view televisions and projection televisions.

Televisions having a format display ratio of 4:3, often referred to as 4×3, are limited in the ways that single and multiple video signal sources can be displayed. Television signal transmissions of commercial broadcasters, except for experimental material, are broadcast with a 4×3 format display ratio. Many viewers find the 4×3 display format less pleasing than the wider format display ratio associated with the movies. Televisions with a wide format display ratio provide not only a more pleasing display, but are capable of displaying wide display format signal sources in a corresponding wide display format. Movies "look" like movies, not cropped or distorted versions thereof. The video source need not be cropped, either when converted from film to video, for example with a telecine device, or by processors in the television.

Televisions with a wide display format ratio are also suited to a wide variety of displays for both conventional and wide display format signals, as well as combinations thereof in multiple picture displays. However, the use of a wide display ratio screen entails numerous problems. Changing the display format ratios of multiple signal sources, developing consistent timing signals from asynchronous but simultaneously displayed sources, switching between multiple sources to generate multiple picture displays, and providing high resolution pictures from compressed data signals are general categories of such problems. Such problems are solved in a wide screen television according to this invention. A wide screen television according to the various aspects of this invention is capable of providing high resolution, single and multiple picture displays, from single and multiple asynchronous sources having similar or different format ratios, and with selectable display format ratios.

When an auxiliary picture is a small inset, various artifacts from imprecise synchronization with the main signal are tolerable. However, for some formats particularly suited for a wide screen television, such as two side by side pictures of equal size, such imprecision and artifacts cannot be tolerated. The large size of the auxiliary picture can make such artifacts painfully obvious. Generally, the video display and deflection system for composite picture displays is synchronized with the main video signal. The auxiliary video signal must be vertically synchronized with the main video signal and the video display. In a relatively inexpensive system, the auxiliary video signal can be delayed by a fraction of a field period in a field memory, and then speeded up in a line memory. In a relatively expensive and sophisticated system, such as is commonly used in broadcast quality studios, a four field synchronization system utilizes four dual port asynchronous field memories. Asynchronous memories, that is, those having independent write and read clock ports, are generally more expensive than synchronous memories.

According to inventive arrangements described herein, a degree of field synchronization can be achieved which substantially matches the performance of a four field system, but utilizes only a single synchronous video RAM as a field memory and a single asynchronous first in first out (FIFO) multiple line memory device. If the FIFO is a five line memory, the following artifacts can be encountered: (1) Two frame line shifts and 1 field line shift will occur each time the two signals precess through a video frame; and, (2) The auxiliary channel video gets scrambled at the bottom of the picture whenever the precession rate between the main and auxiliary signals if greater than two lines per frame. This precession rate has been found not likely to occur in the consumer electronics environment. The cost saving over a four field system is approximately 4:1, without incurring any significant sacrifice in performance. The size of the FIFO is related to the minimum line storage capacity thought to be reasonably necessary to avoid read/write pointer collisions. Read/write pointer collisions occur when old data is read out of the FIFO before new data has an opportunity to be written into the FIFO. Read/write pointer collisions also occur when new data overwrites the memory before the old data has an opportunity to be read out of the FIFO. The size of FIFO utilized herein, for example 2048×8, corresponds to approximately five lines.

A field synchronization system for asynchronous video signals comprises a video display synchronized with a first video signal. The first video signal has a first line rate component and a first field rate component, corresponding to the horizontal and vertical synchronizing components of the first video signal. A field memory, having synchronous write and read ports, is provided for a second video signal. The second video signal has a second line rate component, corresponding to the horizontal synchronizing component of the second video signal. A multiple line memory (FIFO) for the second video signal has asynchronous write and read ports and independently resettable write and read pointers. The second video signal, subsampled if necessary, is stored in the field memory and written to the field memory synchronously with the second line rate component. The second video signal, subsampled if necessary, is written into the multiple line memory synchronously with the second line rate component. The data corresponding to the second video signal is therefor completely orthogonal, having been subsampled and stored synchronously with its own synchronizing components. The second video signal, subsampled if necessary, is read from the multiple line memory synchronously with the first line rate component. A sampling and delay circuit controls resetting the write and read pointers. A write pointer reset signal is generated by sampling the first field rate component with the second line rate component. The write pointer is reset up to one line period of the second video signal after every start of field of the first video signal. A read pointer reset signal is generated by sampling the first field rate component with the first line rate component. The read pointer is reset at least two line periods of the first video signal after every start of field of the first video signal, and more particularly, at least two but not more than three line periods of the first video signal after every start of field of the first video signal.

Data blocks from the video RAM are written into 2048×8 FIFO with the same clock was used to sample the video data, for example a $640f_H$ clock which is locked to the auxiliary signal, rather than the main signal. The FIFO is read using the display clock frequency, for example $1024f_H$, which is locked to horizontal synchronizing component of the main video channel. The use of a multiple line memory (FIFO) which has independent read and write port clocks enables data which was orthogonally sampled at a first rate to be displayed orthogonally at a second rate. The use of the asynchronous FIFO for the auxiliary channel does not solve all of the problems associated with video synchronization. Since the reading and writing of data from the auxiliary channel FIFO is asynchronous, there is the possibility that interlace integrity between the signals will be compromised. Interlace integrity requires that the same field type in each signal be displayed at the same time. It is also possible to encounter read/write pointer collisions in the FIFO. A read/write pointer collision occurs when a read enable signal is received before old data, that has already been read previously, has been replaced by newly written data.

Maintaining interlace integrity of the auxiliary channel video is a problem stemming from reading and writing of the FIFO in the auxiliary signal path asynchronously relative to the main signal. Since the display is locked to the main channel video, the current field type being displayed, that is the upper or lower field, will be determined by the main signal. The field type which is stored in a video RAM memory in the auxiliary signal path or channel for synchronization with the main signal, and ready to be read out at the start of the main channel field, may or may not be the same as the displayed field type. It may be necessary to change the auxiliary signal field type stored in the video RAM to match that of the main channel display.

Generally, a digitizing process for an NTSC signal will quantize 262.5 line fields of the NTSC signal into 263 line upper fields (U, sometimes referred to odd fields) and 262 line lower fields (L, sometimes called even fields). This is due to fact that vertical sync is sampled with pulses representing horizontal sync. The upper fields include odd lines 1 through 263. The lower fields include even lines 2 through 262.

Upper and lower field types are recognized in accordance with an inventive arrangement. Three field type indicators correspond to three modes of operation, designated A, B and C. A first field type indicator U/L(A) represents the field type stored in the auxiliary channel video RAM if each auxiliary channel line were written in "normally". The term normal is used here to indicate that the odd lines 1–263 are written in to the video RAM as the upper field is being received and decoded. A second field type indicator U/L(B) represents the field type stored in the video RAM if the first line of the upper field is not written into the video RAM during the reception of an upper field. Instead, the first line is actually tacked onto the last line (number 262) of the lower field. This effectively inverts the field type since line 2 will be the first displayed line and line 3 will be the second displayed line in the frame. The received upper field now becomes the lower field and vice-versa. A third field type indicator U/L(C) represents the field type stored in the video RAM if the last line of the upper field is added to the video RAM during the reception of the lower field. This effectively inverts the field type, since line 263 will be the first displayed line and line 1 will be the second displayed line. The addition and subtraction of lines in modes B and C does not degrade the auxiliary channel picture because these lines occur during vertical retrace or overscan.

As the main and auxiliary channel signals precess, the U/L field type will change with respect to the auxiliary channel U/L(A,B,C) field type indicators. According to an inventive arrangement, the field type is changed as necessary to maintain interlace integrity, as the field type is continuously detected during the signal precession. A synchronization system for asynchronous video signals according to this inventive arrangement comprises first and second field type detectors for first and second video signals respectively, each having an output indicating whether the respective video signal has a first or second field type. A video memory, for example a synchronous video RAM and an asynchronous multiple line FIFO, synchronize the second video signal with the first video signal for a combined display. A field reversing circuit changes the field type of the second video signal when necessary to match the field type of the first video signal to maintain interlace integrity in the combined display.

In further accord with this inventive arrangement, the field reversing circuit controls writing into the memory, having a first mode of operation which delays writing a current field of the first field type by one horizontal line period, a second mode of operation which advances writing a current field of the second field type by one horizontal line period and a third mode of operation which maintains a current field type. A comparator compares the field type of the second signal to the field type of the first signal and generates an output signal indicating one of a plurality of comparison outcomes, wherein the first and second video signals have current fields of the same field type, the first video signal has a current field of the first field type and the second video signal has a current field of the second field type or the first video signal has a current field of the second field type and the second video signal has a current field of the first field type. A signal generator develops a plurality of selectable interlace correction signals, each being appropriate for one of the plurality of comparison outcomes.

FIGS. 1(a)–1(i) are useful for explaining different display formats of a wide screen television.

FIGS. 16-18 are useful for explaining a method for maintaining interlace integrity for simultaneously displayed video signals exhibiting relative precession.

Figure 20:
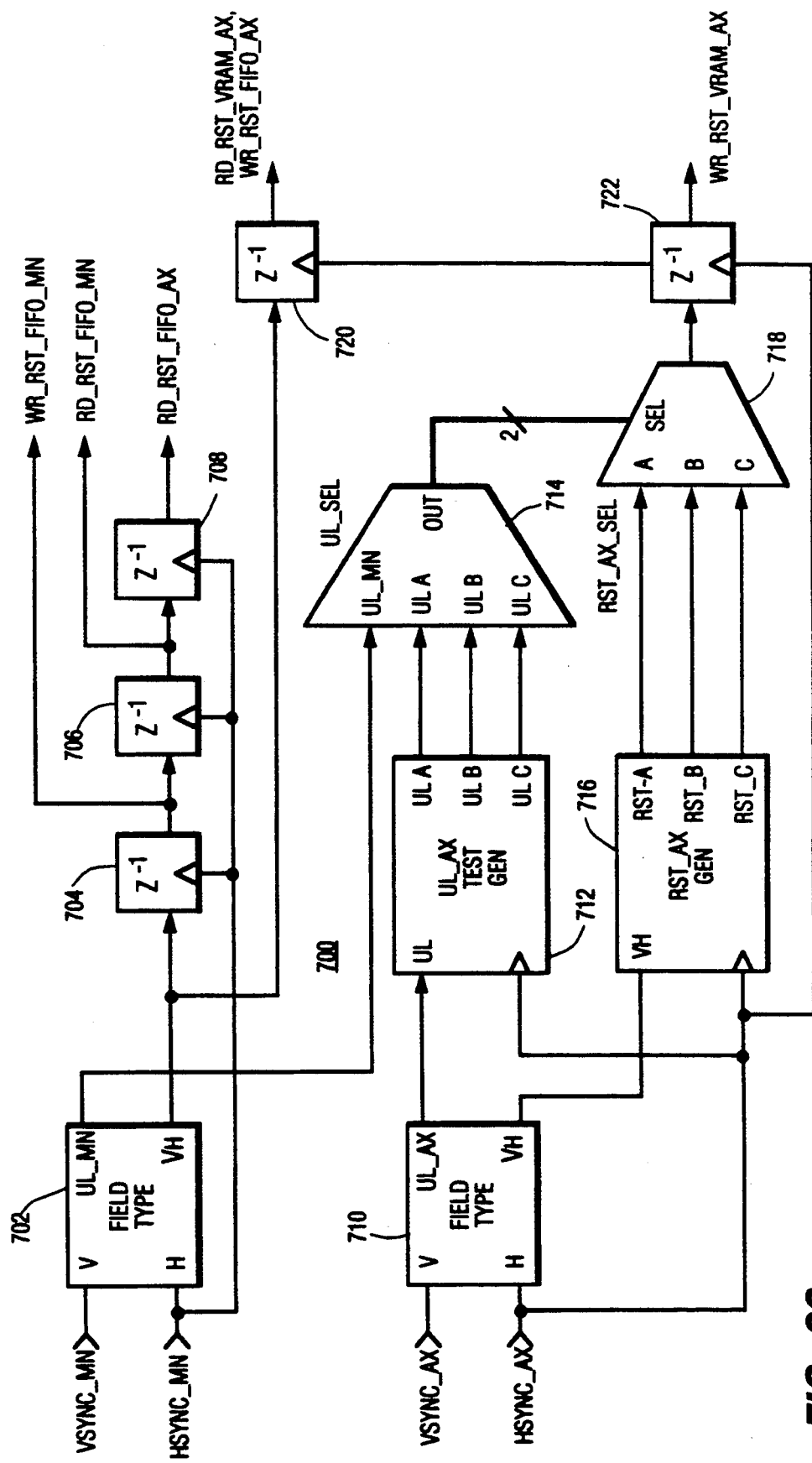

FIGS. 19(a)-19(c) are waveforms useful for explaining the operation of the circuit shown in FIG. 20.

FIG. 20 is a block diagram of a circuit for maintaining interlace integrity as explained in connection with FIGS. 16-18.

The various parts of FIG. 1 illustrate some, but not all of the various combinations of single and multiple picture display formats which can be implemented according to different inventive arrangements. Those selected for illustration are intended to facilitate the description of particular circuits comprising wide screen televisions according to the inventive arrangements. For purposes of convenience in illustration and discussion herein, a conventional display format ratio of width to height for a video source or signal is generally deemed to be 4×3, whereas a wide screen display format ratio of width to height for a video source or signal is generally deemed to be 16×9. The inventive arrangements are not limited by these definitions.

FIG. 1(a) illustrates a television, direct view or projection, having a conventional format display ratio of 4×3. When a 16×9 format display ratio picture is transmitted, as a 4×3 format display ratio signal, black bars appear at the top and at the bottom. This is commonly referred to as letterbox format. In this instance, the viewed picture is rather small with respect to the entire available display area. Alternatively, the 16×9 format display ratio source is converted prior to transmission, so that it will fill the vertical extent of a viewing surface of 4×3 format display. However, much information will be cropped from the left and/or right sides. As a further alternative, the letterbox picture can be expanded vertically but not horizontally, whereby the resulting picture will evidence distortion by vertical elongation. None of the three alternatives is particularly appealing.

FIG. 1(b) shows a 16×9 screen. A 16×9 format display ratio video source would be fully displayed, without cropping and without distortion. A 16×9 format display ratio signal, can picture, which is itself in a 4×3 format display ratio signal, can be progressively scanned by line doubling or line addition, so as to provide a larger display with sufficient vertical resolution. A wide screen television in accordance with this invention can display such a 16×9 format display ratio signal whether the main source, the auxiliary source or an external RGB source.

FIG. 1(c) illustrates a 16×9 format display ratio main signal in which a 4×3 format display ratio inset picture is displayed. If both the main and auxiliary video signals are 16×9 format display ratio sources, the inset picture can also have a 16×9 format display ratio. The inset picture can be displayed in many different positions.

FIG. 1(d) illustrates a display format, wherein the main and auxiliary video signals are displayed with the same size picture. Each display area has an format display ratio of 8×9, which is of course different from both 16×9 and 4×3. In order to show a 4×3 format display ratio source in such a display area, without horizontal or vertical distortion, the signal must be cropped on the left and/or right sides. More of the picture can be shown, with less cropping, if some aspect ratio distortion by horizontal squeezing of the picture is tolerated. Horizontal squeezing results in vertical elongation of objects in the picture. The wide screen television according to this invention can provide any mix of cropping and aspect ratio distortion from maximum cropping with no aspect ratio distortion to no cropping with maximum aspect ratio distortion.

Data sampling limitations in the auxiliary video signal processing path complicate the generation of a high resolution picture which is as large in size as the display from the main video signal. Various methods can be developed for overcoming these complications.

FIG. 1(e) is a display format wherein a 4×3 format display ratio picture is displayed in the center of a 16×9 format display ratio screen. Dark bars are evident on the right and left sides.

FIG. 1(f) illustrates a display format wherein one large 4×3 format display ratio picture and three smaller 4×3 format display ratio pictures are displayed simultaneously. A smaller picture outside the perimeter of the large picture is sometimes referred to as a POP, that is a picture-outside-picture, rather than a PIP, a picture-in-picture. The terms PIP or picture-in-picture are used herein for both display formats. In those circumstances where the wide screen television is provided with two tuners, either both internal or one internal and one external, for example in a video cassette recorder, two of the displayed pictures can display movement in real time in accordance with the source. The remaining pictures can be displayed in freeze frame format. It will be appreciated that the addition of further tuners and additional auxiliary signal processing paths can provide for more than two moving pictures. It will also be appreciated that the large picture on the one hand, and the three small pictures on the other hand, can be switched in position, as shown in FIG. 1(g).

FIG. 1(h) illustrates an alternative wherein the 4×3 format display ratio picture is centered, and six smaller 4×3 format display ratio pictures are displayed in vertical columns on either side. As in the previously described format, a wide screen television provided with two tuners can provide two moving pictures. The remaining eleven pictures will be in freeze frame format.

FIG. 1(i) shows a display format having a grid of twelve 4×3 format display ratio pictures. Such a display format is particularly appropriate for a channel selection guide, wherein each picture is at least a freeze frame from a different channel. As before, the number of moving pictures will depend upon the number of available tuners and signal processing paths.

The various formats shown in FIG. 1 are illustrative, and not limiting, and can be implemented by wide screen televisions shown in the remaining drawings and described in detail below.

Figure 2:
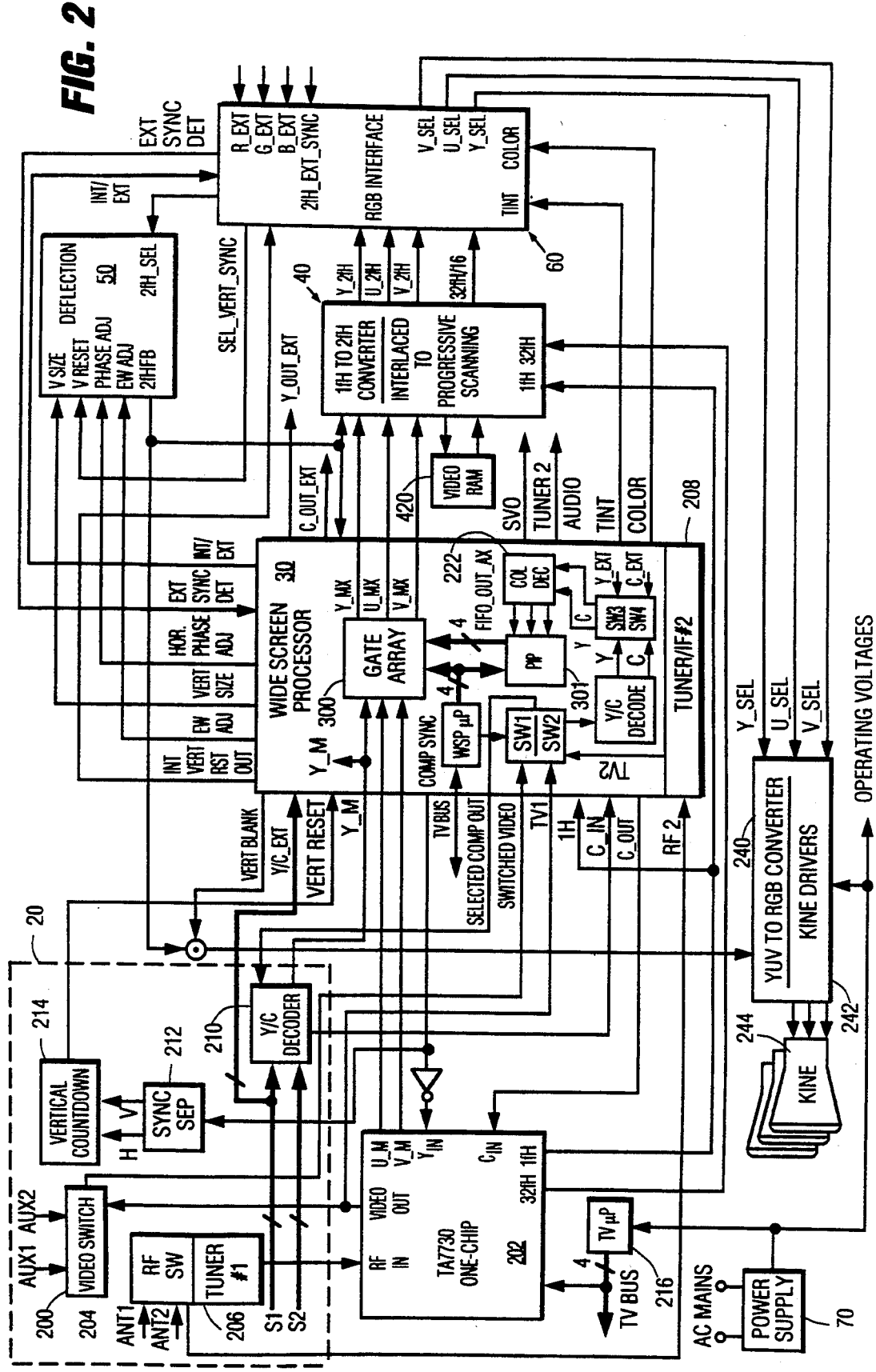
FIG. 2 is a block diagram of a wide screen television in accordance with aspects of this invention and adapted for operation at $2f_H$ horizontal scanning.

An overall block diagram for a wide screen television in accordance with inventive arrangements, and adapted to operate with $2f_H$ horizontal scanning, is shown in FIG. 2 and generally designated 10. The television 10 generally comprises a video signals input section 20, a chassis or TV microprocessor 216, a wide screen processor 30, a $1f_H$ to $2f_H$ converter 40, a deflection circuit 50, an RGB interface 60, a YUV to RGB converter 240, kine drivers 242, direct view or projection tubes 244 and a power supply 70. The grouping of various circuits into different functional blocks is made for purposes of convenience in description, and is not intended as limiting the physical position of such circuits relative to one another.

The video signals input section 20 is adapted for receiving a plurality of composite video signals from different video sources. The video signals may be selectively switched for display as main and auxiliary video signals. An RF switch 204 has two antenna inputs ANT1 and ANT 2. These represent inputs for both off-air antenna reception and cable reception. The RF switch 204 controls which antenna input is supplied to a first tuner 206 and to a second tuner 208. The output of first tuner 206 is an input to a one-chip 202, which performs a number of functions related to tuning, horizontal and vertical deflection and video controls. The particular one-chip shown is industry designated type TA7730. The baseband video signal VIDEO OUT developed in the one-chip and resulting from the signal from first tuner 206 is an input to both video switch 200 and the TV1 input of wide screen processor 30. Other baseband video inputs to video switch 200 are designated AUX1 and AUX 2. These might be used for video cameras, laser disc players, video tape players, video games and the like. The output of the video switch 200, which is controlled by the chassis or TV microprocessor 216 is designated SWITCHED VIDEO. The SWITCHED VIDEO is another input to wide screen processor 30.

Figure 3:
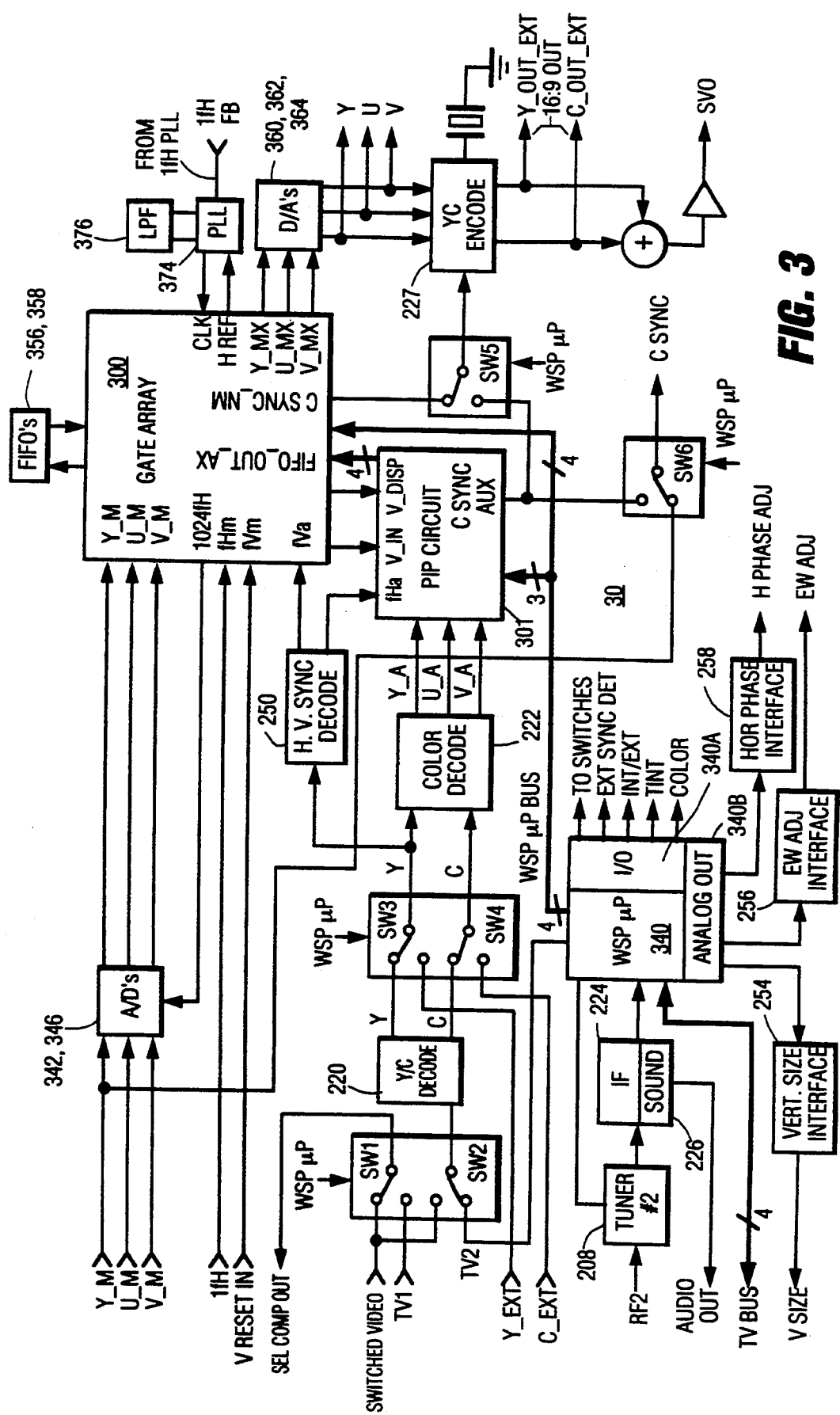
FIG. 3 is a block diagram of the wide screen processor shown in FIG. 2.

With further reference to FIG. 3, a switch SW1 wide screen processor selects between the TV1 and SWITCHED VIDEO signals as a SEL COMP OUT video signal which is an input to a Y/C decoder 210. The Y/C decoder 210 may be implemented as an adaptive line comb filter. Two further video sources S1 and S2 are also inputs to the Y/C decoder 210. Each of S1 and S2 represent different S-VHS sources, and each consists of separate luminance and chrominance signals. A switch, which may be incorporated as part of the Y/C decoder, as in some adaptive line comb filters, or which may be implemented as a separate switch, is responsive to the TV microprocessor 216 for selecting one pair of luminance and chrominance signals as outputs designated Y_M and C_IN respectively. The selected pair of luminance and chrominance signals is thereafter considered the main signal and is processed along a main signal path. Signal designations including _M or _MN refer to the main signal path. The chrominance signal C_IN is redirected by the wide screen processor back to the one-chip, for developing color difference signals U_M and V_M. In this regard, U is an equivalent designation for (R-Y) and V is an equivalent designation for (B-Y). The Y_M, U_M, and V_M signals are converted to digital form in the wide screen processor for further signal processing.

The second tuner 208, functionally defined as part of the wide screen processor 30, develops a baseband video signal TV2. A switch SW2 selects between the TV2 and SWITCHED VIDEO signals as an input to a Y/C decoder 220. The Y/C decoder 220 may be implemented as an adaptive line comb filter. Switches SW3 and SW4 select between the luminance and chrominance outputs of Y/C decoder 220 and the luminance and chrominance signals of an external video source, designated Y_EXT and C_EXT respectively. The Y_EXT and C_EXT signals correspond to the S-VHS input S1. The Y/C decoder 220 and switches SW3 and SW4 may be combined, as in some adaptive line comb filters. The output of switches SW3 and SW4 is thereafter considered the auxiliary signal and is processed along an auxiliary signal path. The selected luminance output is designated Y_A. Signal designations including _A, _AX and _AUX refer to the auxiliary signal path. The selected chrominance is converted to color difference signals U_A and V_A. The Y_A, U_A and V_A signals are converted to digital form for further signal processing. The arrangement of video signal source switching in the main and auxiliary signal paths maximizes flexibility in managing the source selection for the different parts of the different picture display formats.

A composite synchronizing signal COMP SYNC, corresponding to Y_M is provided by the wide screen processor to a sync separator 212. The horizontal and vertical synchronizing components H and V respectively are inputs to a vertical countdown circuit 214. The vertical countdown circuit develops a VERTICAL RESET signal which is directed into the wide screen processor 30. The wide screen processor generates an internal vertical reset output signal INT VERT RST OUT directed to the RGB interface 60. A switch in the RGB interface 60 selects between the internal vertical reset output signal and the vertical synchronizing component of the external RGB source. The output of this switch is a selected vertical synchronizing component SEL_VERT_SYNC directed to the deflection circuit 50. Horizontal and vertical synchronizing signals of the auxiliary video signal are developed by sync separator 250 in the wide screen processor.

The $1f_H$ to $2f_H$ converter 40 is responsible for converting interlaced video signals to progressively scanned noninterlaced signals, for example one wherein each horizontal line is displayed twice, or an additional set of horizontal lines is generated by interpolating adjacent horizontal lines of the same field. In some instances, the use of a previous line or the use of an interpolated line will depend upon the level of movement which is detected between adjacent fields or frames. The converter circuit 40 operates in conjunction with a video RAM 420. The video RAM may be used to store one or more fields of a frame, to enable the progressive display. The converted video data as $Y\_2f_H$, $U\_2f_H$ and $V\_2f_H$ signals is supplied to the RGB interface 60.

Figure 11:
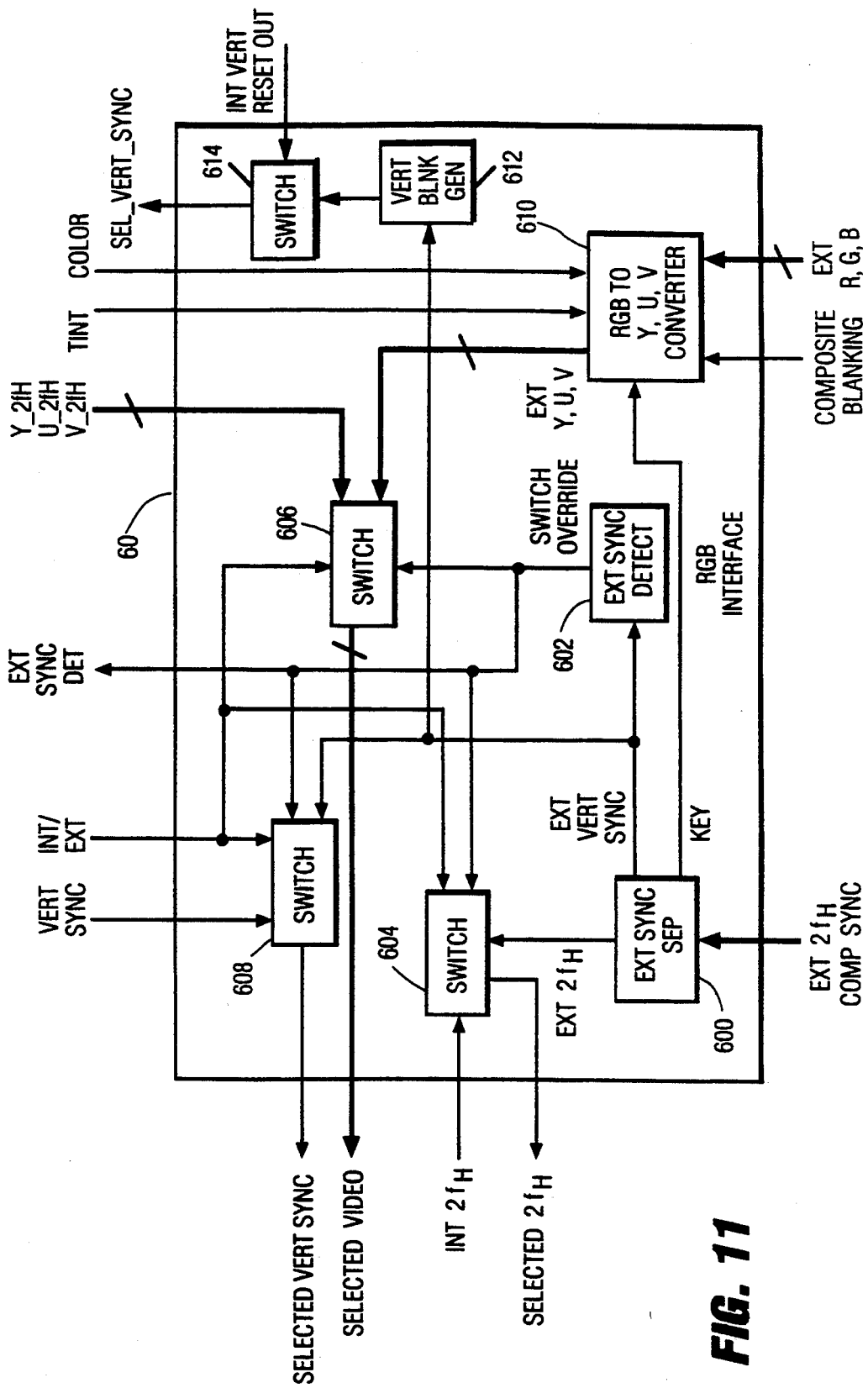
FIG. 11 is a block diagram of the RGB interface shown in FIG. 2.

The RGB interface 60, shown in more detail in FIG. 11, enables selection of the converted video data or external RGB video data for display by the video signals input section. The external RGB signal is deemed to be a wide format display ratio signal adapted for $2f_H$ scanning. The vertical synchronizing component of the main signal is supplied to the RGB interface by the wide screen processor as INT VERT RST OUT, enabling a selected vertical sync ($f_{Vm}$ or $f_{Vext}$) to be available to the deflection circuit 50. Operation of the wide screen television enables user selection of an external RGB signal, by generating an internal/external control signal INT-/EXT. However, the selection of an external RGB signal input, in the absence of such a signal, can result in vertical collapse of the raster, and damage to the cathode ray tube or projection tubes. Accordingly, the RGB interface circuit detects an external synchronizing signal, in order to override the selection of a non-existent external RGB input. The WSP microprocessor 340 also supplies color and tint controls for the external RGB signal.

The wide screen processor 30 comprises a picture in picture processor 320 for special signal processing of the auxiliary video signal. The term picture-in-picture is sometimes abbreviated as PIP or pix-in-pix. A gate array 300 combines the main and auxiliary video signal data in a wide variety of display formats, as shown by the examples of FIGS. 1(b) through 1(i). The picture-in-picture processor 320 and gate array 300 are under the control of a wide screen microprocessor (WSP μP) 340. Microprocessor 340 is responsive to the TV microprocessor 216 over a serial bus. The serial bus includes four signal lines, for data, clock signals, enable signals and reset signals. The wide screen processor 30 also generates a composite vertical blanking/reset signal, as a three level sandcastle signal. Alternatively, the vertical blanking and reset signals can be generated as separate signals. A composite blanking signal is supplied by the video signal input section to the RGB interface.

Figure 10:
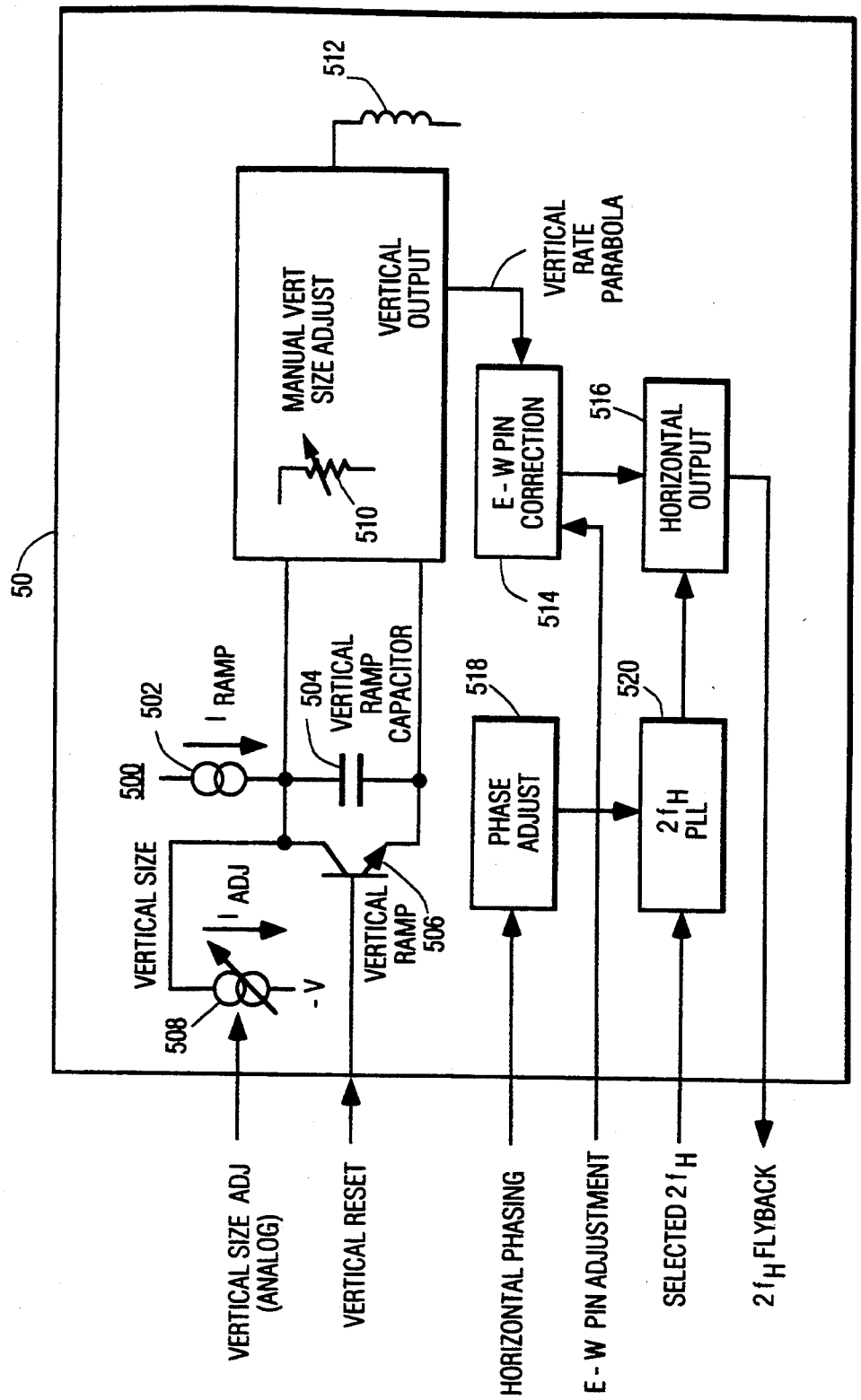
FIG. 10 is a combination block and circuit diagram for the deflection circuit shown in FIG. 2.

The deflection circuit 50, shown in more detail in FIG. 10, receives a vertical reset signal from the wide screen processor, a selected $2f_H$ horizontal synchronizing signal from the RGB interface 60 and additional control signals from the wide screen processor. These additional control signals relate to horizontal phasing, vertical size adjustment and east-west pin adjustment. The deflection circuit 50 supplies $2f_H$ flybacks pulses to the wide screen processor 30, the $1f_H$ to $2f_H$ converter 40 and the YUV to RGB converter 240.

Operating voltages for the entire wide screen television are generated by a power supply 70 which can be energized by an AC mains supply.

Figure 4:
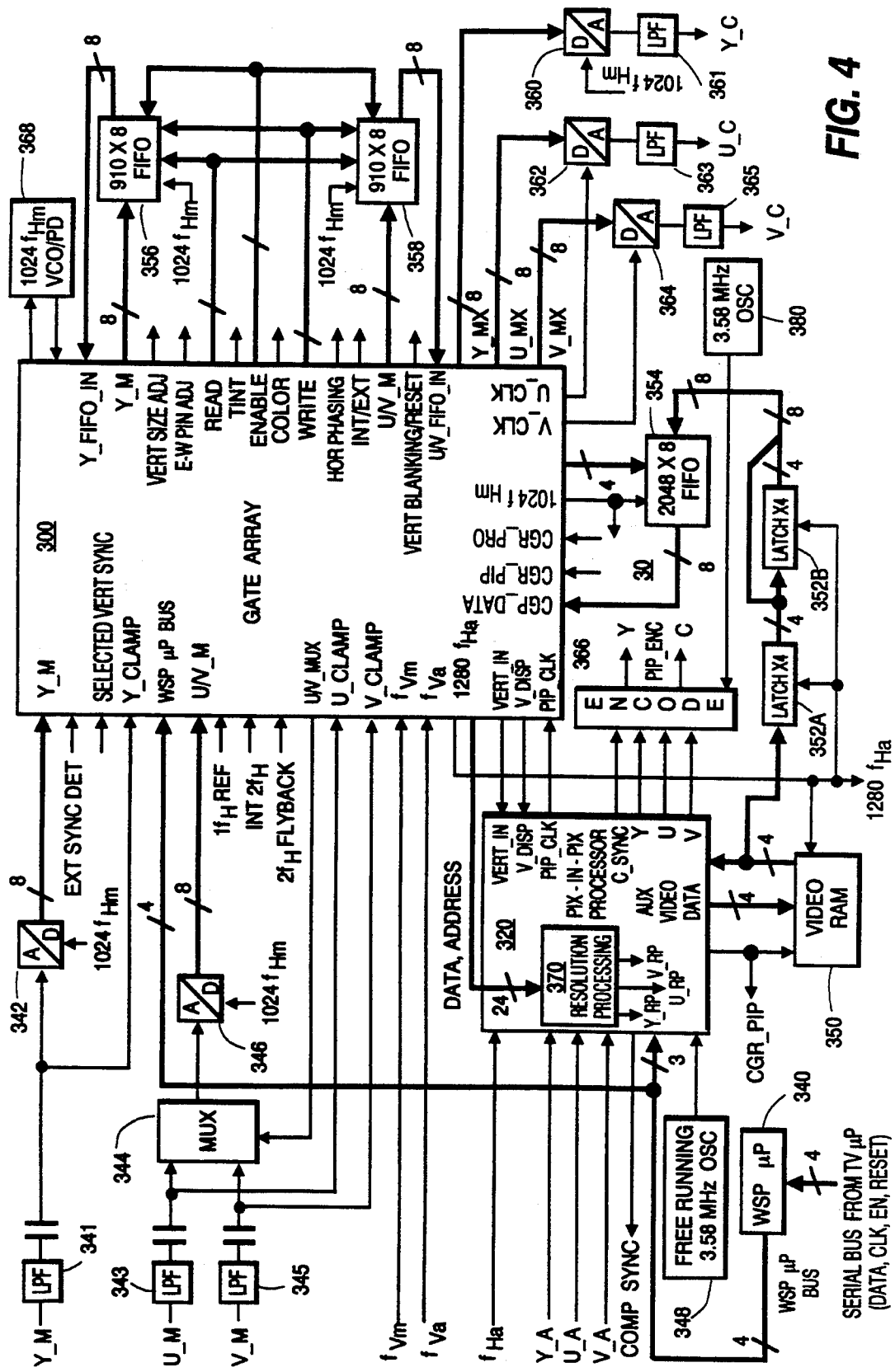
FIG. 4 is a block diagram showing further details of the wide screen processor shown in FIG. 3.

The wide screen processor 30 is shown in more detail in FIG. 3. The principal components of the wide screen processor are a gate array 300, a picture-in-picture circuit 301, analog to digital and digital to analog converters, the second tuner 208, a wide screen processor microprocessor 340 and a wide screen output encoder 227. Further details of the wide screen processor are shown in FIG. 4. A picture-in-picture processor 320, which forms a significant part of the PIP circuit 301, is shown in more detail in FIG. 5. The gate array 300 is shown in more detail in FIG. 6. A number of the components shown in FIG. 3 have already been described in detail.

The second tuner 208 has associated therewith an IF stage 224 and an audio stage 226. The second tuner 208 also operates in conjunction with the WSP μP 340. The WSP μP 340 comprises an input output I/O section 340A and an analog output section 340B. The I/O section 340A provides tint and color control signals, the INT/EXT signal for selecting the external RGB video source and control signals for the switches SW1 through SW6. The I/O section also monitors the EXT SYNC DET signal from the RGB interface to protect the deflection circuit and cathode ray tube(s). The analog output section 340B provides control signals for vertical size, east-west adjust and horizontal phase, through respective interface circuits 254, 256 and 258.

The gate array 300 is responsible for combining video information from the main and auxiliary signal paths to implement a composite wide screen display, for example one of those shown in the different parts of FIG. 1. Clock information for the gate array is provided by phase locked loop 374, which operates in conjunction with low pass filter 376. The main video signal is supplied to the wide screen processor in analog form, and Y U V format, as signals designated Y_M, U_M and V_M. These main signals are converted from analog to digital form by analog to digital converters 342 and 346, shown in more detail in FIG. 4.

The color component signals are referred to by the generic designations U and V, which may be assigned to either R-Y or B-Y signals, or I and Q signals. The sampled luminance bandwidth is limited to 8 MHz because the system clock rate is $1024f_H$, which is approximately 16 MHz. A single analog to digital converter and an analog switch can be used to sample the color component data because the U and V signals are limited to 500 KHz, or 1.5 MHz for wide I. The select line UV_MUX for the analog switch, or multiplexer 344, is an 8 MHz signal derived by dividing the system clock by 2. A one clock wide start of line SOL pulse synchronously resets this signal to zero at the beginning of each horizontal video line. The UV_MUX line than toggles in state each clock cycle through the horizontal line. Since the line length is an even number of clock cycles, the state of the UV_MUX, once initialized, will consistently toggle 0, 1, 0, 1, . . . , without interruption. The Y and UV data streams out of the analog to digital converters 342 and 346 are shifted because the analog to digital converters each have 1 clock cycle of delay. In order to accommodate for this data shift, the clock gating information from the main signal processing path 304 must be similarly delayed. Were the clock gating information not delayed, the UV data will not be correctly paired when deleted. This is important because each UV pair represents one vector. A U element from one vector cannot be paired with a V element from another vector without causing a color shift. Instead, a V sample from a previous pair will be deleted along with the current U sample. This method of UV multiplexing is referred to as 2:1:1, as there are two luminance samples for every pair of color component (U, V) samples. The Nyquist frequency for both U and V is effectively reduced to one half of the luminance Nyquist frequency. Accordingly, the Nyquist frequency of the output of the analog to digital converter for the luminance component is 8 MHz, whereas the Nyquist frequency of the output of the analog to digital converter for the color components is 4 MHz.

The PIP circuit and/or the gate array may also include means for enhancing the resolution of the auxiliary data notwithstanding the data compression. A number of data reduction and data restoration schemes have been developed, including for example paired pixel compression and dithering and dedithering. Moreover, different dithering sequences involving different numbers of bits and different paired pixel compressions involving different numbers of bits are contemplated. One of a number of particular data reduction and restoration schemes can be selected by the WSP μP 340 in order to maximize resolution of the displayed video for each particular kind of picture display format.

The gate array includes interpolators which operate in conjunction with line memories, which may be implemented as FIFO's 356 and 358. The interpolator and FIFO's are utilized to resample the main signal as desired. An additional interpolator can resample the auxiliary signal. Clock and synchronizing circuits in the gate array control the data manipulation of both the main and auxiliary signals, including the combination thereof into a single output video signal having Y_MX, U_MX and V_MX components. These output components are converted to analog form by digital to analog converters 360, 362 and 364. The analog form signals, designated Y, U and V, are supplied to the $1f_H$ to $2f_H$ converter 40 for conversion to noninterlaced scanning. The Y, U and V signals are also encoded to Y/C format by encoder 227 to define a wide format ratio output signal Y_OUT_EXT/C_OUT_EXT available at panel jacks. Switch SW5 selects a synchronizing signal for the encoder 227 from either the gate array, C_SYNC_MN, or from the PIP circuit, C_SYNC_AUX. Switch SW6 selects between Y_M and C_SYNC_AUX as synchronizing signal for the wide screen panel output.

Figure 9:
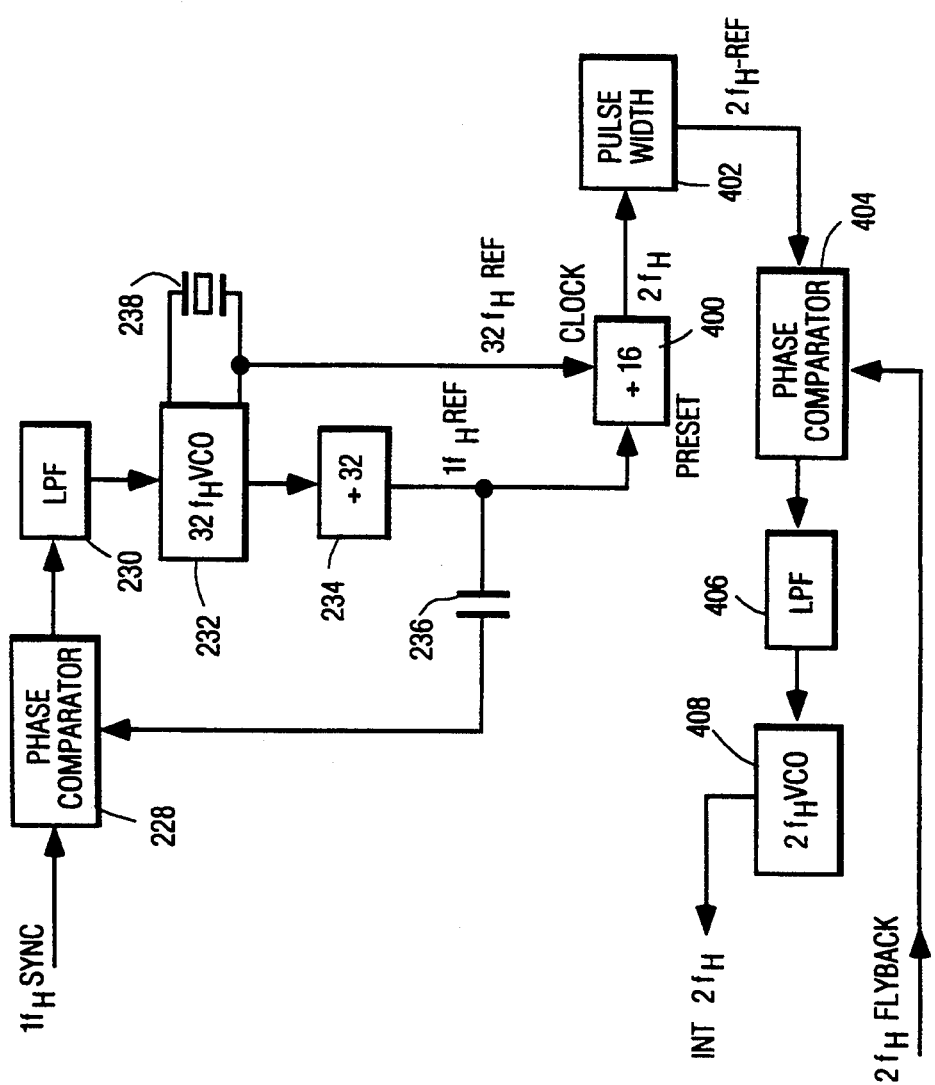
FIG. 9 is a block diagram of a circuit for generating the internal $2f_H$ signal in the $1f_H$ to $2f_H$ conversion.

Portions of the horizontal synchronizing circuit are shown in more detail in FIG. 9. Phase comparator 228 is part of a phase locked loop including low pass filter 230, voltage controlled oscillator 232, divider 234 and capacitor 236. The voltage controlled oscillator 232 operates at $32f_H$, responsive to a ceramic resonator or the like 238. The output of the voltage controlled oscillator is divided by 32 to provide a proper frequency second input signal to phase comparator 228. The output of the divider 234 is a $1f_H$ REF timing signal. The $32f_H$ REF and $1f_H$ REF timing signals are supplied to a divide by 16 counter 400. A $2f_H$ output is supplied to a pulse width circuit 402. Presetting divider 400 by the $1f_H$ REF signal assures that the divider operates synchronously with the phase locked loop of the video signals input section. Pulse width circuit 402 assures that a $2f_H$-REF signal will have an adequate pulse width to assure proper operation of the phase comparator 404, for example a type CA1391, which forms part of a second phase locked loop including low pass filter 406 and $2f_H$ voltage controlled oscillator 408. Voltage controlled oscillator 408 generates an internal $2f_H$ timing signal, which is used for driving the progressively scanned display. The other input signal to phase comparator 404 is the $2f_H$ flyback pulses or a timing signal related thereto. The use of the second phase locked loop including phase comparator 404 is useful for assuring that each $2f_H$ scanning period is symmetric within each $1f_H$ period of the input signal. Otherwise, the display may exhibit a raster split, for example, wherein half of the video lines are shifted to the right and half of the video lines are shifted to the left.

The deflection circuit 50 is shown in more detail in FIG. 10. A circuit 500 is provided for adjusting the vertical size of the raster, in accordance with a desired amount of vertical overscan necessary for implementing different display formats. As illustrated diagrammatically, a constant current source 502 provides a constant quantity of current $I_{RAMP}$ which charges a vertical ramp capacitor 504. A transistor 506 is coupled in parallel with the vertical ramp capacitor, and periodically discharges the capacitor responsive to the vertical reset signal. In the absence of any adjustment, current $I_{RAMP}$ provides the maximum available vertical size for the raster. This might correspond to the extent of vertical overscan needed to fill the wide screen display by an expanded 4×3 format display ratio signal source, as shown in FIG. 1(a). To the extent that less vertical raster size is required, an adjustable current source 508 diverts a variable amount of current $I_{ADJ}$ from $I_{RAMP}$, so that vertical ramp capacitor 504 charged more slowly and to a smaller peak value. Variable current source 508 is responsive to a vertical size adjust signal, for example in analog form, generated by a vertical size control circuit. Vertical size adjustment 500 is independent of a manual vertical size adjustment 510, which may be implemented by a potentiometer or back panel adjustment knob. In either event, the vertical deflection coil(s) 512 receive(s) driving current of the proper magnitude. Horizontal deflection is provided by phase adjusting circuit 518, East-West pin correction circuit 514, a $2f_H$ phase locked loop 520 and horizontal output circuit 516.

The RGB interface circuit 60 is shown in more detailed in FIG. 11. The signal which is to be ultimately displayed will be selected between the output of the $1f_H$ to $2f_H$ converter 40 and an external RGB input. For purposes of the wide screen television described herein, the external RGB input is presumed to be a wide format display ratio, progressively scanned source. The external RGB signals and a composite blanking signal from the video signals input section 20 are inputs to an RGB to Y U V converter 610. The external $2f_H$ composite synchronizing signal for the external RGB signal is an input to external synchronizing signal separator 600. Selection of the vertical synchronizing signal is implemented by switch 608. Selection of the horizontal synchronizing signal is implemented by switch 604. Selection of the video signal is implemented by switch 606. Each of the switches 604, 606 and 608 is responsive to an internal/external control signal generated by the WSP μP 340. Selection of internal or external video sources is a user selection. However, if a user inadvertently selects an external RGB source, when no such source is connected or turned on, or if the external source drops out, the vertical raster will collapse, and serious damage to the cathode ray tube(s) can result. Accordingly, an external synchronizing detector 602 checks for the presence of an external synchronizing signal. In the absence of such a signal, a switch override control signal is transmitted to each of switches 604, 606 and 608, to prevent selection of the external RGB source if the signal therefrom is not present. The RGB to YUV converter 610 also receives tint and color control signals from the WSP μP 340.

FIG. 4 is a block diagram showing further details of the wide screen processor 30 shown in FIG. 3. The Y_A, U_A and V_A signals are an input to the picture in picture processor 320, which can include a resolution processing circuit 370. The wide screen television according to aspects of this invention can expand and compress video. The special effects embodied by the various composite display formats illustrated in part in FIG. 1 are generated by the picture-in-picture processor 320, which can receive resolution processed data signals Y_RP, U_RP and V_RP from resolution processing circuit 370. Resolution processing need not be utilized at all times, but during selected display formats. The picture-in-picture processor 320 is shown in more detail in FIG. 5. The principal components of the picture-in-picture processor are an analog-to-digital converter section 322, an input section 324, a fast switch (FSW) and bus section 326, a timing and control section 328 and a digital-to-analog converter section 330.

The picture-in-picture processor 320 may be embodied as an improved variation of a basic CPIP chip developed by Thomson Consumer Electronics, Inc. The basic CPIP chip is described more fully in a publication entitled The CTC 140 Picture in Picture (CPIP) Technical Training Manual, available from Thomson Consumer Electronics, Inc., Indianapolis, Ind. A number of special features or special effects are possible, the following being illustrative. The basic special effect is a large picture having a small picture overlaying a portion thereof as shown in FIG. 1(c). The large and small pictures can result from the same video signal, from different video signals and can be interchanged or swapped. Generally speaking, the audio signal is switched to always correspond to the big picture. The small picture can be moved to any position on the screen or can step through a number of predetermined positions. A zoom feature increases and decreases the size of the small picture, for example to any one of a number of preset sizes. At some point, for example the display format shown in FIG. 1(d), the large and small pictures are in fact the same size.

In a single picture mode, for example that shown in FIGS. 1(b), 1(e) or 1(f) a user can zoom in on the content of the single picture, for example, in steps from a ratio of 1.0:1 to 5.0:1. While in the zoom mode a user may search or pan through the picture content enabling the screen image to move across different areas of the picture. In either event, either the small picture or the large picture or the zoomed picture can be displayed in freeze frame (still picture format). This function enables a strobe format, wherein the last nine frames of video can be repeated on the screen. The frame repetition rate can be changed from thirty frames per second to zero frames per second.

The picture-in-picture processor used in the wide screen television according to another inventive arrangement differs from the present configuration of the basic CPIP chip described above. If the basic CPIP chip were used with a television having a 16×9 screen, and without a video speed up circuit, the inset pictures would exhibit aspect ratio distortion, due to the effective 4/3 times horizontal expansion resulting from scanning across the wider 16×9 screen. Objects in the picture would be horizontally elongated. If an external speed up circuit were utilized, there would be no aspect ratio distortion, but the picture would not fill the entire screen.

Existing picture-in-picture processors based on the basic CPIP chip as used in conventional televisions are operated in a particular fashion having certain undesirable consequences. The incoming video is sampled with a 640$f_H$ clock which is locked to the horizontal synchronizing signal of the main video source. In other words, data stored in the video RAM associated with the CPIP chip is not orthogonally sampled with respect to the incoming auxiliary video source. This is a fundamental limitation on the basic CPIP method of field synchronization. The nonorthogonal nature of the input sampling rate results in skew errors of the sampled data. The limitation is a result of the video RAM used with the CPIP chip, which must use the same clock for writing and reading data. When data from the video RAM, such as video RAM 350, is displayed, the skew errors are seen as random jitter along vertical edges of the picture and are generally considered quite objectionable.

The picture-in-picture processor 320, according to an inventive arrangement and unlike the basic CPIP chip, is adapted for asymmetrically compressing the video data in one of a plurality of selectable display modes. In this mode of operation, the pictures are compressed 4:1 in the horizontal direction and 3:1 in the vertical direction. This asymmetric mode of compression produces aspect ratio distorted pictures for storage in the video RAM. Objects in the pictures are squeezed horizontally. However, if these pictures are read out normally, as for example in the channel scan mode, for display of a 16×9 format display ratio screen, the pictures appear correct. The picture fills the screen and there is no aspect ratio distortion. The asymmetric compression mode according to this aspect of the invention makes it possible to generate the special display formats on a 16×9 screen without external speed up circuitry.

In full screen PIP modes, the picture-in-picture processor, in conjunction with a free running oscillator 348 will take Y/C input from a decoder, for example an adaptive line comb filter, decode the signal into Y, U, V color components and generate horizontal and vertical sync pulses. These signals are processed the picture-in-picture processor for the various full screen modes such as zoom, freeze and channel scan. During the channel scan mode, for example, the horizontal and vertical sync present from the video signals input section will have many discontinuities because the signals sampled (different channels) will have non-related sync pulses and will be switched at seemingly random moments in time. Therefore the sample clock (and read/write video RAM clock) is determined by the free running oscillator. For freeze and zoom modes, the sample clock will be locked to incoming video horizontal sync, which in these special cases is the same as the display clock frequency.

Referring again to FIG. 4, Y, U, V and C_SYNC (composite sync) outputs from the picture-in-picture processor in analog form can be re-encoded into Y/C components by encode circuit 366, which operates in conjunction with a 3.58 MHz oscillator 380. This Y/C_PIP_ENC signal may be connected to a Y/C switch, not shown, which enables the re-encoded Y/C components to be substituted for the Y/C components of the main signal. From this point on, the PIP encoded Y, U, V and sync signals would be the basis for horizontal and vertical timing in the rest of the chassis. This mode of operation is appropriate for implementing a zoom mode for the PIP, based upon operation of the interpolator and FIFO's in the main signal path.

Figure 5:
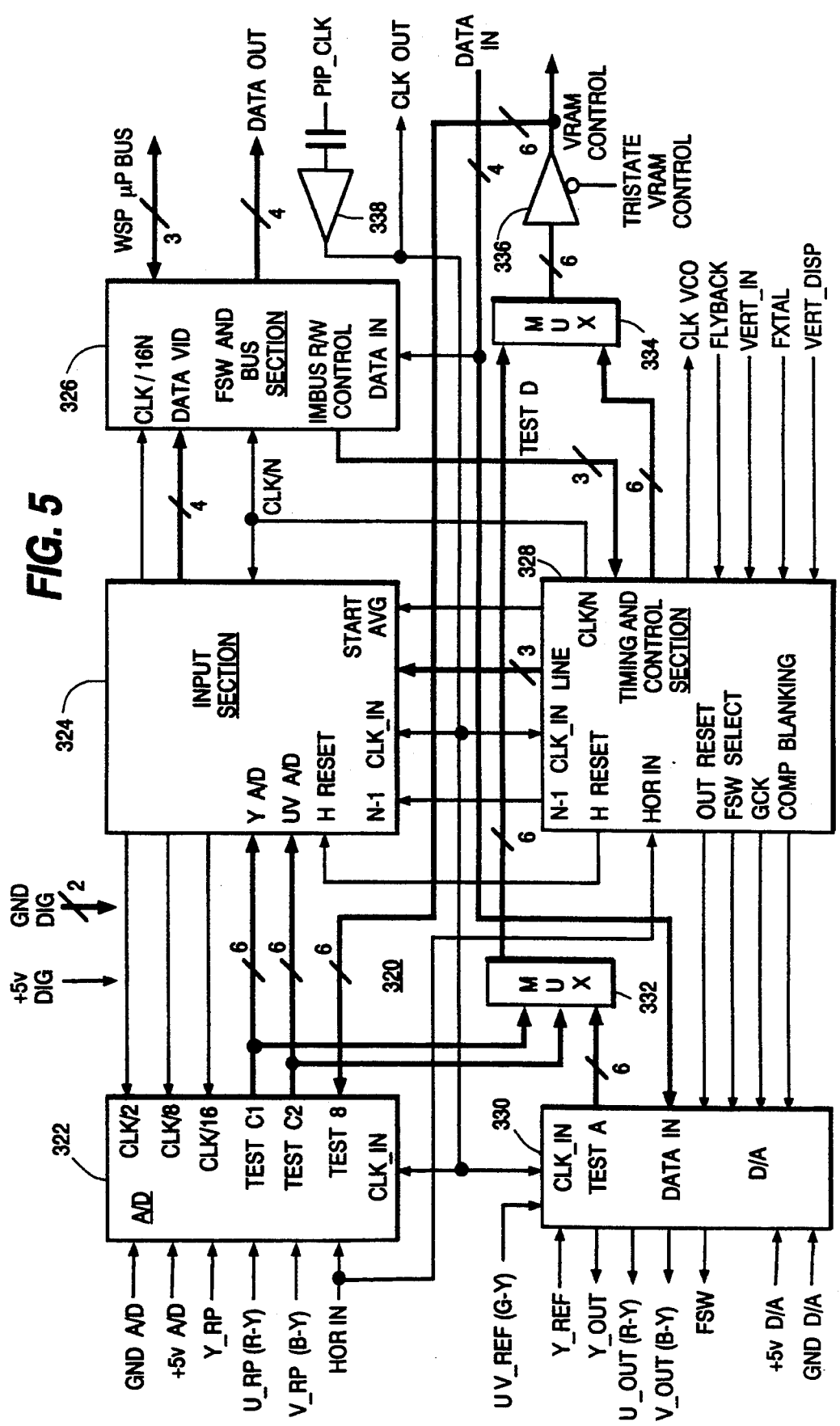
FIG. 5 is a block diagram of the picture-in-picture processor shown in FIG. 4.

With further reference to FIG. 5, the picture-in-picture processor 320 comprises analog to digital converting section 322, input section 324, fast switch FSW and bus control section 326, timing and control section 328 and digital to analog converting section 330. In general, the picture-in-picture processor 320 digitizes the video signal into luminance (Y) and color difference signals (U, V), subsampling and storing the results in a 1 megabit video RAM 350 as explained above. The video RAM 350 associated with the picture-in-picture processor 320 has a memory capacity of 1 megabit, which is not large enough to store a full field of video data with 8-bit samples. Increased memory capacity tends to be expensive and can require more complex management circuitry. The smaller number of bits per sample in the auxiliary channel represents a reduction in quantization resolution, or bandwidth, relative to the main signal, which is processed with 8bit samples throughout. This effective reduction of bandwidth is not usually a problem when the auxiliary displayed picture is relatively small, but can be troublesome if the auxiliary displayed picture is larger, for example the same size as the main displayed picture. Resolution processing circuit 370 can selectively implement one or more schemes for enhancing the quantization resolution or effective bandwidth of the auxiliary video data. A number of data reduction and data restoration schemes have been developed, including for example, paired pixel compression and dithering and dedithering. A dedithering circuit would be operatively disposed downstream of the video RAM 350, for example in the auxiliary signal path of the gate array, as explained in more detail below. Moreover, different dithering and dedithering sequences involving different numbers of bits and different paired pixel compressions involving different number of bits are contemplated. One of a number of particular data reduction and restoration schemes can be selected by the WSP μP in order to maximize resolution of the displayed video for each particular kind of picture display format.

The luminance and color difference signals of the auxiliary signal are stored in an 8:1:1 six-bit Y, U, V fashion in a video RAM 350 forming part of the picture-in-picture processor. In other words, each component is quantized into six-bit samples. There are eight luminance samples for every pair of color difference samples. Briefly, the picture-in-picture processor 320 is operated in a mode whereby incoming video data is sampled with a 640$f_H$ clock rate locked to the incoming auxiliary video synchronizing signal instead. In this mode, data stored in the video RAM 350 is orthogonally sampled. When the data is read out of the picture-in-picture processor video RAM 350, it is read using the same 640$f_H$ clock locked to the incoming auxiliary video signal. However, even though this data was orthogonally sampled and stored, and can be read out orthogonally, it cannot be displayed orthogonally directly from the video RAM 350, due to the asynchronous nature of the main and auxiliary video sources. The main and auxiliary video sources might be expected to be synchronous only in that instance where they are displaying signals from the same video source.

Figure 6:
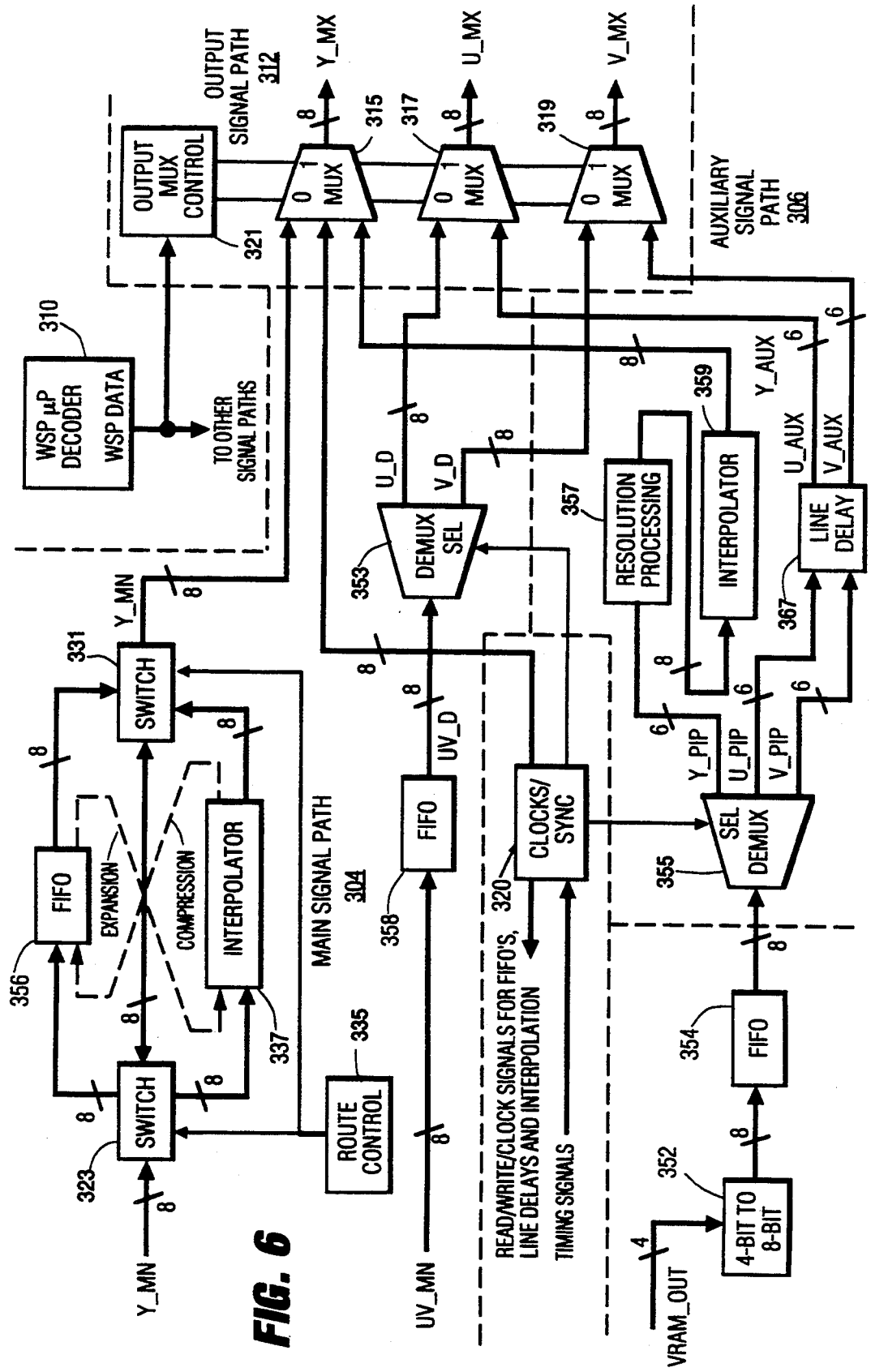
FIG. 6 is a block diagram of the gate array shown in FIG. 4 and illustrating the main, auxiliary and output signal paths.

The main signal path 304, auxiliary signal path 306 and output signal path 312 of the gate array 300 are shown in block diagram form in FIG. 6. The gate array also comprises a clocks/sync circuit 320 and a WSP μP decoder 310. Data and address output lines of the WSP μP decoder 310, identified as WSP DATA, are supplied to each of the main circuits and paths identified above, as well as to the picture-in-picture processor 320 and resolution processing circuit 370. It will be appreciated that whether or not certain circuits are, or are not, defined as being part of the gate array is largely a matter of convenience for facilitating explanation of the inventive arrangements.

The gate array is responsible for expanding, compressing and cropping video data of the main video channel, as and if necessary, to implement different picture display formats. The luminance component Y_MN is stored in a first in first out (FIFO) line memory 356 for a length of time depending on the nature of the interpolation of the luminance component. The combined chrominance components U/V_MN are store in FIFO 358. Auxiliary signal luminance and chrominance components Y_PIP, U_PIP and V_PIP are developed by demultiplexer 355. The luminance component undergoes resolution processing, as desired, in circuit 357, and is expanded as necessary by interpolator 359, generating signal Y_AUX as an output.

In some instances, the auxiliary display will be as large as the main signal display, as shown for example in FIG. 1(d). The memory limitations associated with the picture-in-picture processor and video RAM 350 can provide an insufficient number of data points, or pixels for filling such a large display area. In those circumstances, resolution processing circuit 357 can be used to restore pixels to the auxiliary video signal to replace those lost during data compression, or reduction. The resolution processing may correspond to the resolution processing undertaken by circuit 370 shown in FIG. 4.

As an example, circuit 370 may be a dithering circuit and circuit 357 may be a dedithering circuit.

Figure 12:
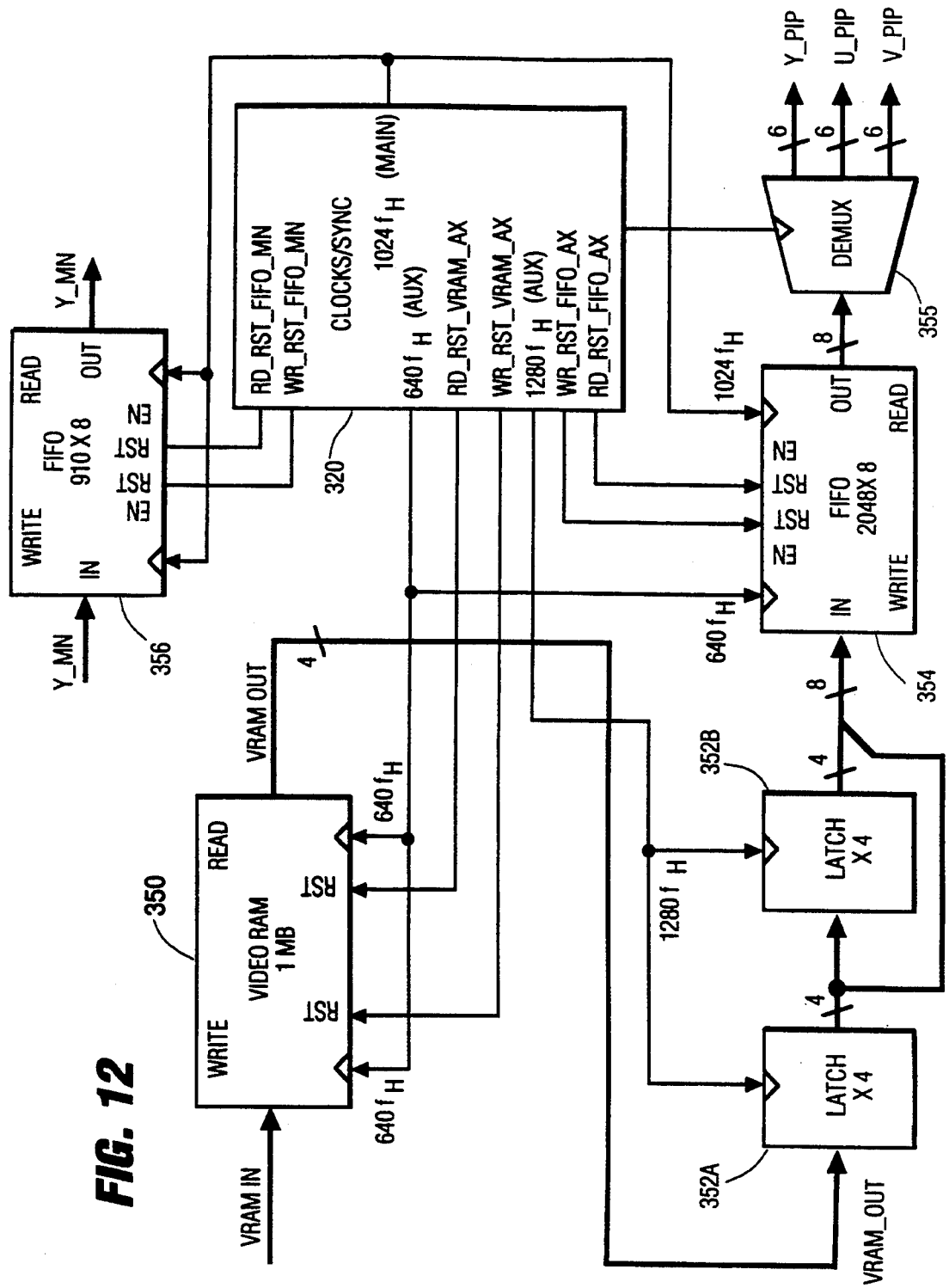
FIG. 12 is a block diagram showing the auxiliary signal path and a portion of the main signal path in more detail.

With further reference to FIG. 12, the auxiliary video input data is sampled at a 640$f_H$ rate and stored in video RAM 350. The auxiliary data is read out of video RAM 350 is designated VRAM_OUT. The PIP circuit 301 also has the capability of reducing the auxiliary picture by equal integer factors horizontally and vertically, as well as asymmetrically. The auxiliary channel data is buffered and synchronized to the main channel digital video by the 4 bit latches 352A and 352B, the auxiliary FIFO 354, timing circuit 369 and synchronization circuit 368. The VRAM_OUT data is sorted into Y (luminance), U, V (color components), and FSW_DAT (fast switch data) by demultiplexer 355. The FSW_DAT indicates which field type was written into the video RAM. The PIP_FSW signal is received directly from the PIP circuit and applied to the output control circuit 321 to determine which field read out of video RAM is to be displayed during the small picture modes.

The auxiliary channel is sampled at 640$f_H$ rate while the main channel is sampled at a 1024$f_H$ rate. The auxiliary channel FIFO 354 converts the data from the auxiliary channel sample rate to the main channel clock rate. In this process, the video signal undergoes an 8/5 (1024/640) compression. This is more than the 4/3 compression necessary to correctly display the auxiliary channel signal. Therefore, the auxiliary channel must be expanded by the interpolator 359 to correctly display a 4×3 small picture. The interpolator 359 is controlled by interpolator control circuit 371, which is itself responsive to WSP μP 340. The amount of interpolator expansion required is 5/6. The expansion factor X is determined as follows:

$$X = (640/1024)*(4/3) = 5/6$$

The chrominance components U_PIP and V_PIP are delayed by circuit 367 for a length of time depending on the nature of the interpolation of the luminance component, generating signals U_AUX and V_AUX as outputs. The respective Y, U and V components of the main and auxiliary signals are combined in respective multiplexers 315, 317 and 319 in the output signal path 312, by controlling the read enable signals of the FIFO's 354, 356 and 358. The multiplexers 315, 317 and 319 are responsive to output multiplexer control circuit 321. Output multiplexer control circuit 321 is responsive to a clock signal, a start of line signal, a horizontal line counter signal, the vertical blanking reset signal and the output of the fast switch from the picture-in-picture processor and WSP μP 340. The multiplexed luminance and chrominance components Y_MX, U_MX and V_MX are supplied to respective digital/analog converters 360, 362 and 364 respectively. The digital to analog converters are followed by low pass filters 361, 363 and 365 respectively, shown in FIG. 4. The various functions of the picture-in-picture processor, the gate array and the data reduction circuit are controlled by WSP μP 340. The WSP μP 340 is responsive to the TV μP 216, being connected thereto by a serial bus. The serial bus may be a four wire bus as shown, having lines for data, clock signals, enable signals and reset signals. The WSP μP 340 communicates with the different circuits of the gate array through a WSP μP decoder 310.

In one case, it is necessary to compress the 4×3 NTSC video by a factor of 4/3 to avoid aspect ratio distortion of the displayed picture. In the other case, the video can be expanded to perform horizontal zooming operations usually accompanied by vertical zooming. Horizontal zoom operations up to 33% can be accomplished by reducing compressions to less than 4/3. A sample interpolator is used to recalculate the incoming video to a new pixel positions because the luminance video bandwidth, up to 5.5 MHz for S-VHS format, occupies a large percentage of the Nyquist fold over frequency, which is 8 MHz for a $1024f_H$ clock.

As shown in FIG. 6, the luminance data Y_MN is routed through an interpolator 337 in the main signal path 304 which recalculates sample values based on the compression or the expansion of the video. The function of the switches or route selectors 323 and 331 is to reverse the topology of the main signal path 304 with respect to the relative positions of the FIFO 356 and the interpolator 337. In particular, these switches select whether the interpolator 337 precedes the FIFO 356, as required for picture compression, or whether the FIFO 356 precedes the interpolator 337 as required for picture expansion. The switches 323 and 331 are responsive to a route control circuit 335, which is itself responsive to the WSP μP 340. It will be remembered that the auxiliary video signal is compressed for storage in the video RAM 350, and only expansion is necessary for practical purposes. Accordingly, no comparable switching is required in the auxiliary signal path.

In order to implement video compressions through the use of a FIFO, for example, every fourth sample can be inhibited from being written into the FIFO 356. This constitutes a 4/3 compression. It is the function of the interpolator 337 to recalculate the luminance samples being written into the FIFO so that the data read out of the FIFO is smooth, rather than jagged. Expansions may be performed in exactly the opposite manner as compressions. In the case of compressions the write enable signal has clock gating information attached to it in the form of inhibit pulses. For expanding data, the clock gating information is applied to the read enable signal. This will pause the data as it is being read from the FIFO 356. In this case it is the function of the interpolator 337, which follows the FIFO 356 during this process, to recalculate the sampled data from jagged to smooth. In the expansion case the data must pause while being read from the FIFO 356 and while being clocked into the interpolator 337. This is different from the compression case where the data is continuously clocked through the interpolator 337. For both cases, compression and expansion, the clock gating operations can easily be performed in a synchronous manner, that is, events can occur based on the rising edges of the system clock $1024f_H$.

Interpolation of the auxiliary signal takes place in the auxiliary signal path 306. The PIP circuit 301 manipulates a 6 bit Y, U, V, 8:1:1 field memory, video RAM 350, to store incoming video data. The video RAM 350 holds two fields of video data in a plurality of memory locations. Each memory location holds eight bits of data. In each 8-bit location there is one 6-bit Y (luminance) sample (sampled at $640f_H$) and 2 other bits. These two other bits hold either fast switch data FSW_DAT) or part of a U or V sample (sampled at $80f_H$). The FSW_DAT values indicate which type of field was written into video RAM. Since there are two fields of data stored in the video RAM 350, and the entire video RAM 350 is read during the display period, both fields are read during the display scan. The PIP circuit 301 will determine which field will be read out of the memory to be displayed through the use of the fast switch data. The PIP circuit always reads the opposite field type that is being written to overcome a motion tear problem. If the field type being read is the opposite type than that being displayed, then the even field stored in the video RAM is inverted by deleting the top line of the field when the field is read out of memory. The result is that the small picture maintains correct interlace without a motion tear.

The clocks/sync circuit 320 generates read, write and enable signals needed for operating FIFOs 354, 356 and 358. The FIFOs for the main and auxiliary channels are enabled for writing data into storage for those portions of each video line which is required for subsequent display. Data is written from one of the main or auxiliary channels, but not both, as necessary to combine data from each source on the same video line or lines of the display. The FIFO 354 of the auxiliary channel is written synchronously with the auxiliary video signal, but is read out of memory synchronously with the main video signal. The main video signal components are read into the FIFOs 356 and 358 synchronously with the main video signal, and are read out of memory synchronously with the main video. How often the read function is switched back and forth between the main and auxiliary channels is a function of the particular special effect chosen.

Figure 7:
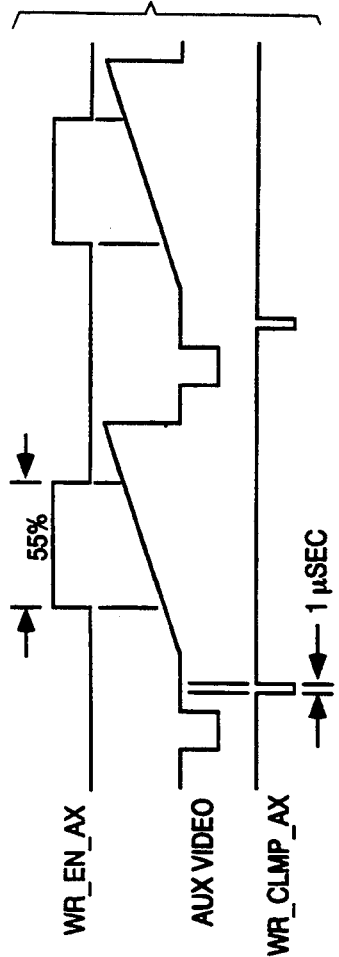
FIGS. 7 and 8 are timing diagrams useful for explaining the generation of the display format shown in FIG. 1(d), using fully cropped signals.
Figure 8:
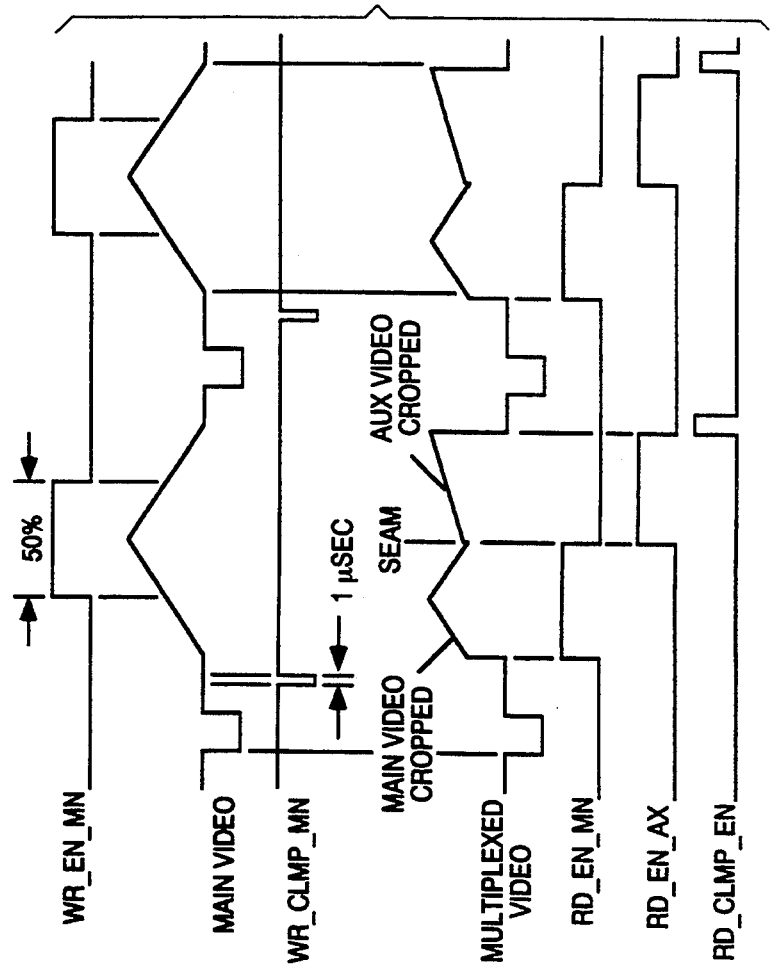

Generation of different special effects such as cropped side-by-side pictures are accomplished through manipulating the read and write enable control signals for the line memory FIFOs. The process for this display format is illustrated in FIGS. 7 and 8. In the case of cropped side-by-side displayed pictures, the write enable control signal (WR_EN_AX) for 2048×8 FIFO 354 of the auxiliary channel is active for $(\frac{1}{2})*(5/12) = 5/12$ or approximately 41% of the display active line period (post speed up), or 67% of the auxiliary channel active line period (pre speed up), as shown in FIG. 7. This corresponds to approximately 33% cropping (approximately 67% active picture) and the interpolator expansion of the signal by 5/6. In the main video channel, shown in the upper part of FIG. 8, the write enable control signal (WR_EN_MN_Y) for the 910×8 FIFOs 356 and 358 is active for $(\frac{1}{2})*(4/3) = 0.67$ or 67% of the display active line period. This corresponds to approximately 33% cropping and a compression ratio of 4/3 being performed on the main channel video by the 910×8 FIFOs.

In each of the FIFOs, the video data is buffered to be read out at a particular point in time. The active region of time where the data may be read out from each FIFO is determined by the display format chosen. In the example of the side-by-side cropped mode shown, the main channel video is being displayed on the left hand half of the display and the auxiliary channel video is displayed on the right hand half of the display. The arbitrary video portions of the waveforms are different for the main and auxiliary channels as illustrated. The read enable control signal (RD_EN 13 MN) of the main channel 910×8 FIFOs is active for 50% of the display active line period of the display beginning with the start of active video, immediately following the video back porch. The auxiliary channel read enable control signal (RD_EN_AX) is active for the other 50% of the display active line period beginning with the falling edge of the RE_EN_MN signal and ending with the beginning of the main channel video front porch. It may be noted that write enable control signals are synchronous with their respective FIFO input data (main or auxiliary) while the read enable control signals are synchronous with the main channel video.

The display format shown in FIG. 1(d) is particularly desirable as it enables two nearly full field pictures to displayed in a side by side format. The display is particularly effective and appropriate for a wide format display ratio display, for example 16×9. Most NTSC signals are represented in a 4×3 format, which of course corresponds to 12×9. Two 4×3 format display ratio NTSC pictures may be presented on the same 16×9 format display ratio display, either by cropping the pictures by 33% or squeezing the pictures by 33%, and introducing aspect ratio distortion. Depending on user preference, the ratio of picture cropping to aspect ratio distortion may be set any where in between the limits of 0% and 33%. As an example, two side by side pictures may be presented as 16.7% squeezed and 16.7% cropped.

The horizontal display time for a 16×9 format display ratio display is the same as a 4×3 format display ratio display, because both have 62.5 microsecond nominal line length. Accordingly, an NTSC video signal must be sped up by a factor of 4/3 to preserve a correct aspect ratio, without distortion. The 4/3 factor is calculated as ratio of the two display formats:

$$4/3 = (16/9) / (4/3)$$

Variable interpolators are utilized in accordance with aspects of this invention to speed up the video signals. In the past, FIFOs having different clock rates at the inputs and outputs have been used to perform a similar function. By way of comparison, if two NTSC 4×3 format display ratio signals are displayed on a single 4×3 format display ratio display, each picture must be distorted or cropped, or some combination thereof, by 50%. A speed up comparable to that needed for a wide screen application is unnecessary.

Generally, the video display and deflection system is synchronized with the main video signal. The main video signal must be speeded up, as explained above, to fill the wide screen display. The auxiliary video signal must be vertically synchronized with the first video signal and the video display. The auxiliary video signal can be delayed by a fraction of a field period in a field memory, and then expanded in a line memory. Synchronization of the auxiliary video data with main video data is accomplished by utilizing the video RAM 350 as a field memory and a first in first out (FIFO) line memory device 354 for expanding the signal.

The asynchronous nature of the read and write clocks, however, does require that steps be undertaken to avoid read/write pointer collisions. Read/write pointer collisions occur when old data is read out of the FIFO before new data has an opportunity to be written into the FIFO. The size of the FIFO is related to the minimum line storage capacity thought to be reasonably necessary to avoid read/write pointer collisions. A field synchronization system for avoiding read/write pointer collisions and maintaining interlace integrity is explained more fully in connection with FIGS. 12-20.

The picture-in-picture processor operates in such a manner that the auxiliary video data is sampled with a 640$f_H$ clock locked to the horizontal synchronizing component of the incoming auxiliary video signal. This operation enables orthogonally sampled data to be stored in the video RAM 350. Data must be read out of the video RAM at the same 640$f_H$ rate. The data cannot be orthogonally displayed from the video RAM without modification due to the generally asynchronous nature of the main and auxiliary video sources. In order to facilitate synchronization of the auxiliary signal to the main signal, a line memory with independent write and read port clocks is disposed in the auxiliary signal path after the output of the video RAM 350.

More particularly, as shown in FIG. 12, the output of the video RAM 350 is an input to the first of two 4-bit latches 352A and 352B. The VRAM_OUT output is in 4-bit data blocks. The 4-bit latches are used to recombine the auxiliary signal back into 8-bit data blocks. The latches also reduce the data clock rate from 1280$f_H$ to 640$f_H$. The 8-bit data blocks are written into the FIFO 354 by the same 640$f_H$ clock used to sample the auxiliary video data for storage in the video RAM 350. The size of FIFO 354 is 2048×8. The 8-bit data blocks are read out of the FIFO 354 by the 1024$f_H$ display clock, which is locked to the horizontal synchronizing component of the main video signal. This basic configuration, which uses a multiple line memory with independent read and write port clocks, enables data which was orthogonally sampled to be displayed orthogonally. The 8-bit data blocks are divided into 6-bit luminance and color difference samples by demultiplexer 355. The data samples may then be interpolated as necessary for the desired format display ratio and written as video data output.

A sufficiently large memory must be chosen in the first instance in order to avoid read/write pointer collision in the auxiliary channel FIFO. For displaying normal formal display ratio video cropped by 33%, the auxiliary FIFO, which is 2048×8 in size. is capable of storing 5.9 lines of video data, calculated as follows, where N is the number if times and L is the length of each line:

$$N = (2/3)*(0.82)*(640) = 350 \text{ based on 82\% active}$$
$$\text{line period } L = 2048/350 = 5.9$$

An aspect of the invention recognizes that precession rates greater than 2 lines/field are not likely to be encountered. Therefore, a design criteria of a 5 line FIFO for the auxiliary channel can be sufficient to prevent read/write pointer collisions.

Figure 13:
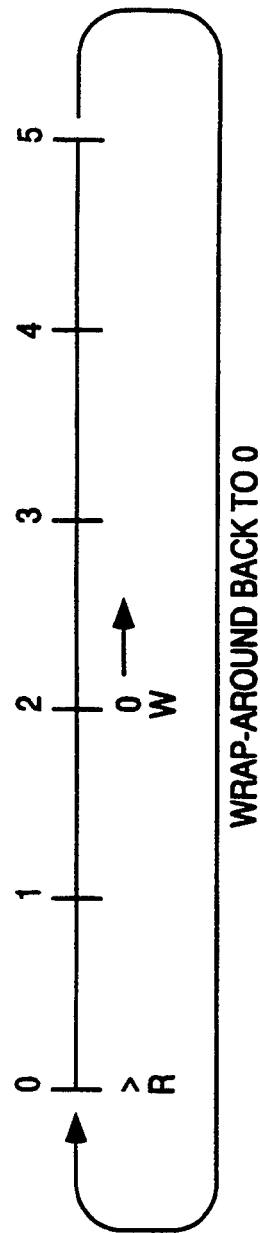
FIG. 13 is a diagram of a five line FIFO line memory useful for explaining avoidance of read/write pointer collisions.
Figure 14:
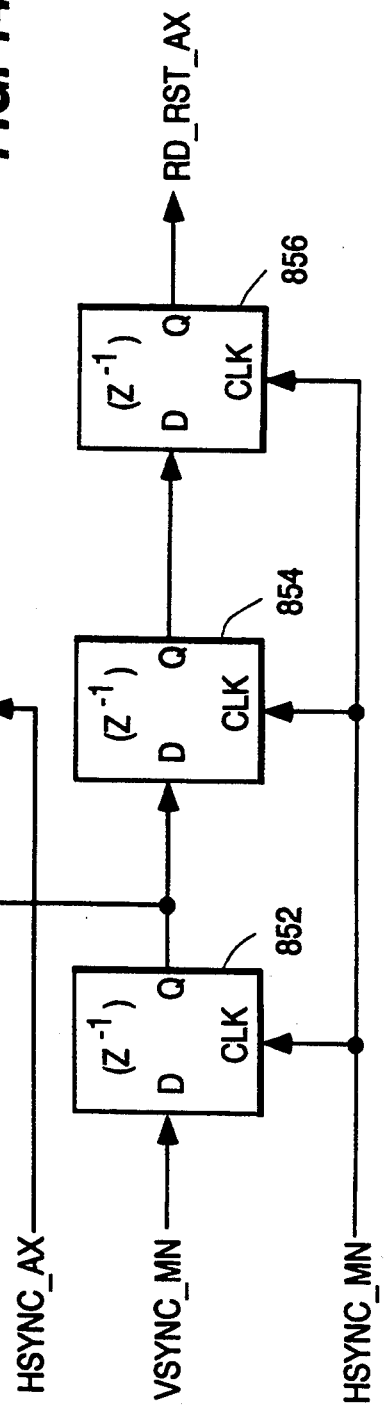
FIG. 14 is a block diagram of a simplified circuit for implementing an auxiliary synchronizing circuit for the gate array.

The memory usage of the auxiliary channel FIFO can be mapped out as shown in FIG. 13. A block diagram for a simplified circuit formed by D-type flip/flops for generating line delays ($Z^{-1}$) and reset pulses for controlling writing and reading in the FIFO 354 in the auxiliary signal path is shown in FIG. 14. At the beginning of a new main signal field, the write pointer is reset to the start of the FIFO. This reset pulse, denoted WR_RST_AX is the combination of V_SYNC_MN sampled by H_SYNC_AX. In other words, WR_RST_AX occurs at the first horizontal synchronizing pulse of the auxiliary video signal which occurs after a vertical synchronizing pulse of the main signal. Two main signal horizontal lines later the read pointer is reset to the start of the FIFO 354. This reset pulse is denoted RD_RST_AX. In other words, RD_RST_AX occurs at the third horizontal synchronizing pulse of the main video signal which occurs after a vertical synchronizing pulse of the main signal, or stated still otherwise, at the second horizontal synchronizing pulse of the main signal which occurs after the WR_RST_AX pulse.

Since the main and auxiliary signals are asynchronous, there is some ambiguity about exactly where the write pointer is when the read pointer is reset. It is known that the write pointer is leading the read pointer by at least two lines. However, if the frequency of the auxiliary channel horizontal sync is higher than the frequency of the main channel horizontal sync, then the write pointer will have advanced past the 2 line marker shown. It is in this way that a pointer collision is avoided for all signals with less than 2 lines/field precession rate. The auxiliary channel FIFO 354 is partitioned into 5 line pieces through appropriately timed read and write reset signals. In this scheme, the read and write pointers are initialized at the beginning of each displayed field at least 2 lines apart from each other.

If the FIFO were not a complete 5 lines long, the system would sacrifice the memory distance from the write pointer to the read pointer. This is the case for different squeeze modes, for example a 16% squeeze:

$$16\% \text{ squeeze} \quad N = (5/6) * (0.82) * 640 = 437$$
$$L = 2048 (5*437) = 4.7$$

In these cases, the FIFO proves to be less than 5 lines long. In the 16% squeeze, the actual FIFO length is 4.7 lines. The (0.8) factor in the N equation of the 33% squeeze reflects an operational limitation of the CPIP chip.

Since the FIFO read and write resets are spaced by a minimum of two lines of active video, the sacrifice always comes at the expense of allowing the read pointer to catch up with the write pointer. Moreover, only 80% of the video line is considered active because the picture-in-picture processor is not capable of storing more than 512 video samples in the video RAM 350. In practice, this still provides a good active video line. In these cases, the precession rate is being sacrificed for more visible picture content. In addition, there is more distortion in the auxiliary video. In the worst case, up to one line per field of precession can be tolerated between the main and auxiliary video sources. This is still more than is necessary for most video sources, and the precession rate tolerance is sacrificed on those feature modes which can be expected to be the least used.

Another problem stemming from the asynchronous reading and writing of the FIFO is that of maintaining interlace integrity of the auxiliary channel video. Since the display is locked to the main channel video, the current field type being displayed, that is the upper or lower field, will be determined by the main signal. The field type which is stored in the video RAM 350 memory and ready to be read out at the start of the main channel field may or may not be the same as the displayed field type. It may be necessary to change the auxiliary field type stored in the video RAM 350 to match that of the main channel display.

Figure 15:
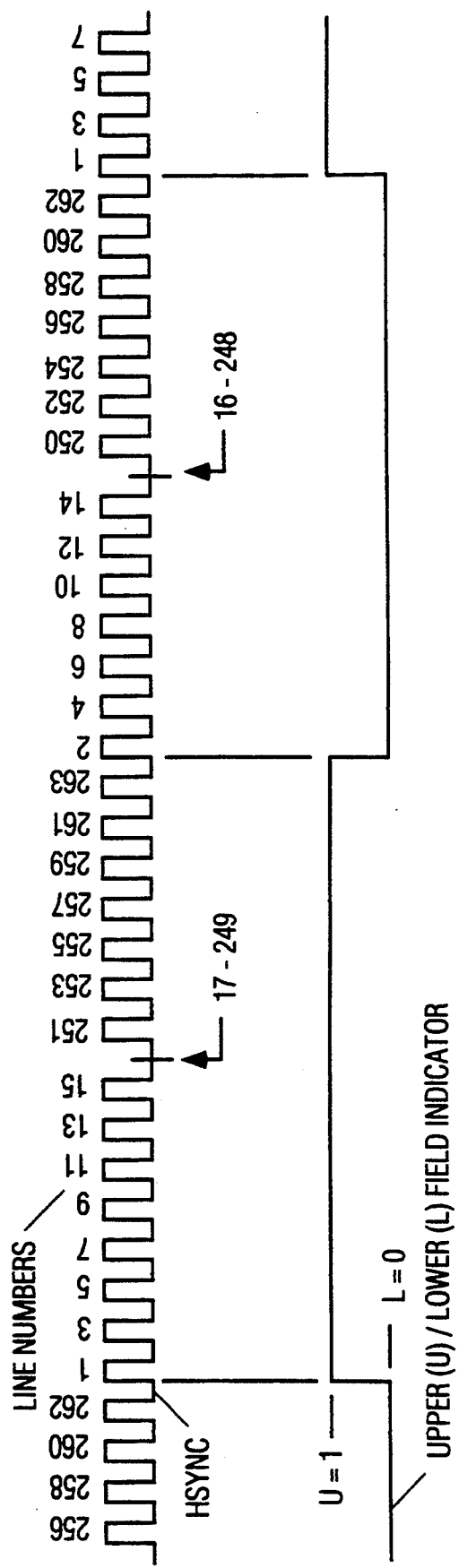
FIG. 15 is a timing diagram illustrating the correspondence of an upper/lower field indicator to the horizontal lines of a video frame.

The picture-in-picture processor 320 and the gate array 300 quantize 262.5 line fields of the NTSC signal into 263 line upper fields (sometimes referred to odd fields) and 262 line lower fields (sometimes called even fields). This is due to fact that vertical sync is sampled with pulses representing horizontal sync. This is illustrated by the diagram of FIG. 15. An upper/lower field type indicator has a value 1 for upper fields and a value 0 for lower fields. The upper fields include odd lines 1 through 263. The lower fields include even lines 2 through 262. In FIG. 16, the first field type indicator U/L MAIN SIGNAL represents the field type of the main video channel. The signal HSYNC_AX represents the horizontal sync signals for each line of the auxiliary channel.

The field type indicator U/L(A) represents the field type stored in the video ram 350 if each auxiliary channel line were written in "normally". The term normal is used here to indicate that the odd lines 1-263 are written in to the video RAM 350 as the upper field is being received and decoded. The field type indicator U/L(B) represents the field type stored in the video RAM 350 if the first line of the upper field is not written into the video RAM 350 during the reception of an upper field. Instead, the first line is actually tacked onto the last line (number 262) of the lower field. This effectively inverts the field type since line 2 will be the first displayed line and line 3 will be the second displayed line in the frame. The received upper field now becomes the lower field and vice-versa. The field type indicator U/L(C) represents the field type stored in the video RAM 350 if the last line of the upper field is added to the video RAM 350 during the reception of the lower field. This effectively inverts the field type, since line 263 will be the first displayed line and line 1 will be the second displayed line.

The addition and subtraction of lines in modes B and C does not degrade the auxiliary channel picture because these lines occur during vertical retrace or overscan. The order of the displayed lines is shown in FIG. 18, where solid lines represent upper field lines and dotted lines represent lower field lines.

As the main and auxiliary channel signals precess, the U/L MAIN SIGNAL will shift to the left or the right with respect to the auxiliary channel U/L(A,B,C) field type indicators. In the position shown in the diagram, data should be written into the video RAM 350 using mode A, because the decision edge is in zone A. Mode A is appropriate because when the picture-in-picture processor receives vertical sync, it will write the same field type into the video RAM 350 as will be required by the display to read from the video RAM 350 starting with V_SYNC_MN (main channel vertical sync). As the signals precess, the mode will change according to their relative positions. The valid modes are shown graphically at the top of FIG. 16 and in the table of FIG. 17. There is an overlap between modes B and C, since most of the time that mode B is valid, mode C is also valid, and vice-versa. This is true for all but 2 lines out of 262 lines. Either of modes B or C can be utilized when both are valid.

A block diagram of a circuit 700 for maintaining interlace integrity according to this inventive arrangement is shown in FIG. 20. The output signals of circuit 700 are write and read reset control signals for the video RAM 350, the FIFO 354 in the auxiliary signal path and the FIFO 356 in the main signal path, as shown in FIG. 12. The field type of the main video signal is determined from a pair of signals, VSYNC_MN AND HSYNC_MN. The field type of the auxiliary video signal is determined from a corresponding pair of signals, VSYNC_AX AND HSYNC_AX. Each pair of signals has a predetermined phase relationship which is set in the gate array. This relationship is shown in FIGS. 19(a)-19(c), which apply to both pairs of signals. In each case, HSYNC is a square wave, whose rising edge corresponds to the start of a horizontal line of the respective signal. In each case, VSYNC has only one rising edge per field, which corresponds to the start of a vertical field of the respective signal. The relationship between the rising edges of the respective pairs of signals is tested by circuit 700 to determine what steps, if any, are necessary to match the field type of the auxiliary signal to the field type of the main signal. In order to prevent ambiguity, the leading edges of the main pair of signals are never closer than ⅛ of a horizontal line period. The leading edges of the auxiliary pair of signals are never closer than 1/10 of a horizontal line period. This prevents jitter of the leading edges relative to one another. This relationship is assured by the timing circuits in the gate array.

The main signal pair VSYNC__MN and HSYNC__MN are inputs to a first field type circuit 702, which comprises two D-type flip/flops. In one case, HSYNC__MN is sampled by VSYNC__MN, that is, VSYNC__MN is the clock input. The output of this flip/flop is an upper/lower field indicator UL__MN for the main signal, which can be a logical HI for an upper field type and a logical LO for a lower field type, although this is arbitrary. In the other case, VSYNC__MN is sampled by HSYNC__MN, just as in flip/flop 852 explained in connection with FIG. 14. This provides an output $V_H$, which is the vertical synchronized to the horizontal.

The auxiliary signal pair VSYNC__AX and HSYNC__AX are inputs to a first field type circuit 710, which also comprises two D-type flip/flops. In one case, HSYNC__AX is sampled by VSYNC__AX, that is, VSYNC__AX is the clock input. The output of this flip/flop is an upper/lower field indicator UL__AX for the auxiliary signal, which can be logical HI for an upper field type and a logical LO for a lower field type, although this is arbitrary. In the other case, VSYNC__AX is sampled by HSYNC__AX, just as in flip/flop 852 explained in connection with FIG. 14. This provides an output $V_H$, which is the vertical synchronized to the horizontal.

The field type determination for both signals is shown in FIGS. 19(a)-19(c). If the rising start of field edge occurs in the first half of the horizontal line period, as in FIG. 19(b), the field is a lower field type. If the rising start of field edge occurs in the second half of the horizontal line period, as in FIG. 19(c), the field is an upper field type.

The $V_H$ for the main signal and HSYNC__MN are inputs to delay circuits 704, 706 and 708, which provide horizontal line period delays to assure the proper phase relationship of the output signals WR__RST__FIFO__MN, RD__RST__FIFO__MN and RD__RST__FIFO__AX. The delay operation, which can be implemented by D-type flip/flops, is similar to the circuit shown in FIG. 14. Two to three horizontal line periods of delay are provided between the write and read pointers.

Figure 16:
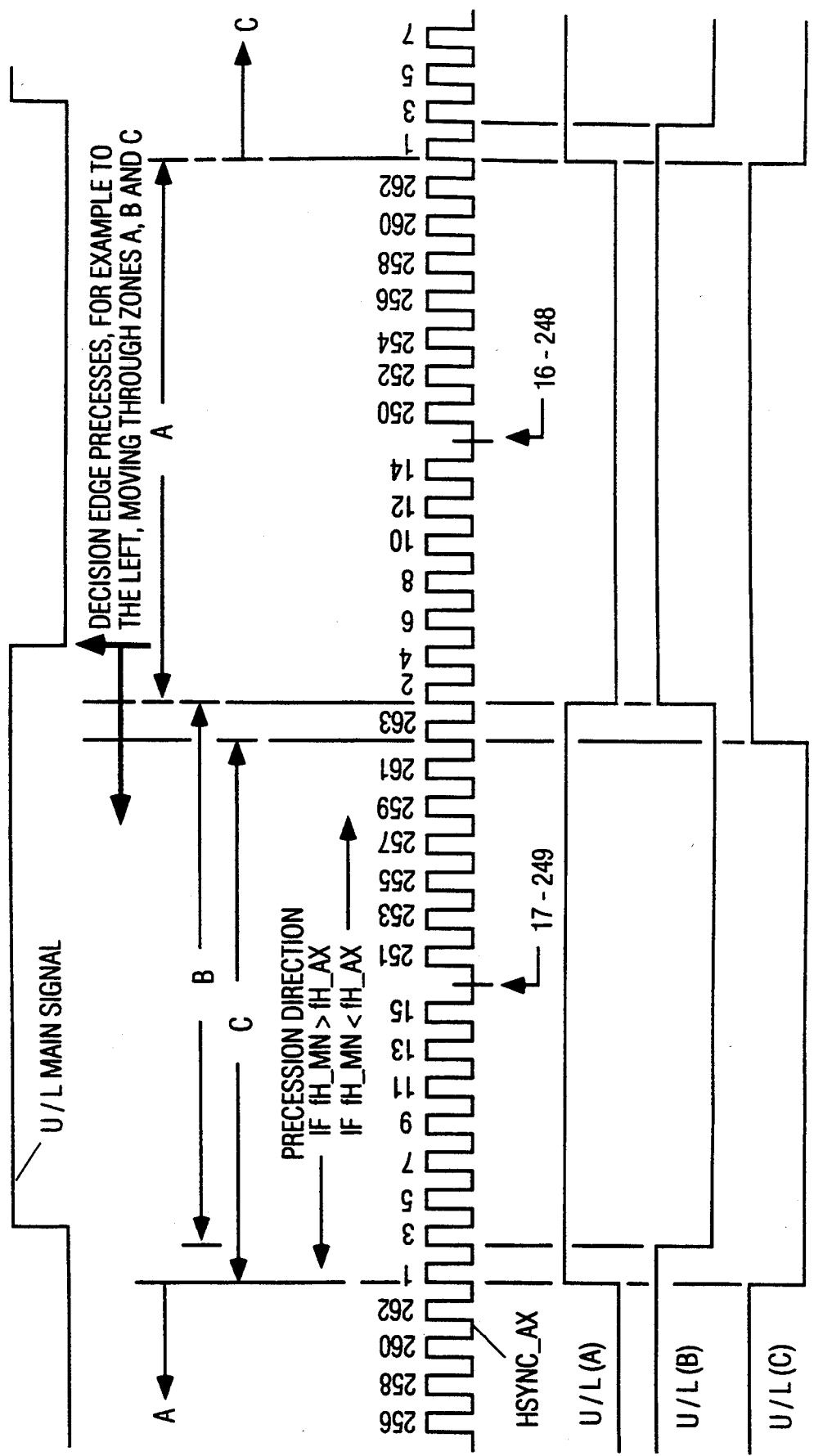

The upper/lower field type indicator UL__MN corresponds to U/L MAIN SIGNAL shown at the top of FIG. 16 and is one input to a UL__SEL comparator 714. The other inputs to comparator 714 are supplied by UL__AX test generator 712. Test generator 712 has the UL__AX field indicator as an input, as well as HSYNC__AX as a clock input. Test generator 712 provides signals U/L(A), U/L(B) and U/L(C) shown in the bottom of FIG. 16, corresponding to the three possible modes A, B and C. Each of the signals U/L(A), U/L(B) and U/L(C) is compared with UL__MN, at the time of the decision edge of U/L__MN, also shown in FIG. 16. If UL__MN matches U/L(A), the field types match and no action to maintain interlace integrity is necessary. If UL__MN matches U/L(B), the field types do not match. It is necessary to delay writing the upper field by one line to maintain interlace integrity. If UL__MN matches U/L(C), the field types do not match. It is necessary to advance writing the lower field by one line to maintain interlace integrity.

The results of this comparison are an input to RST__AX__SEL selector circuit 718. The other inputs are the three vertical synchronizing signals RST__A, RST__B and RST__C generated by RST__AX__GEN generator 716. The three vertical synchronizing signals RST__A, RST__B and RST__C have different phases relative to one another in order to implement the corrective action, or no corrective action, to maintain interlace integrity according to the output of the comparator 714. Delay circuit 722 resynchronizes the selected vertical synchronizing signal with the auxiliary video input to generate WR__RST__VRAM__AX. Delay circuit 720 performs a similar function for generating RD__RST__VRAM__AX and WR__RST__FIFO__AX. As seen in FIG. 16, modes B and C overlap most of the time. In fact, only two out of every 525 comparisons will require only one of modes B or C, rather than either. The comparator 714 can be arranged to favor mode C over mode B when both modes are valid. This choice can be arbitrary, or based on other circuit considerations.

We claim:

1. A field type matching system, comprising:
    first and second field type detecting means for first and second video signals respectively, each of said detecting means having an output indicating whether said respective video signal has a first or second field type;
    means for generating test signals indicative of comparisons between said outputs indicating said field types of said first and second video signals;
    means for generating field type control signals for changing and maintaining the field type of one of said video signals to match the field type of the other of said video signals; and,
    means responsive to said test signals and at least one of said field type detecting means for selecting one of said field type control signals for implementing said matching.

2. The system of claim 1, further comprising means for synchronizing said second video signal with said first video signal for a combined display.

3. The system of claim 2, wherein said synchronizing means comprises means for storing said second video signal, said second video signal being written into said storing means synchronously with said second video signal and being read out of said storing means synchronously with said first video signal.

4. The system of claim 2, wherein said synchronizing means comprises:
    a synchronous field memory, having write and read ports operable synchronously with said second video signal; and,
    an asynchronous multiple line memory for data read from said field memory, having a write port operable synchronously with said second video signal and a read port operable synchronously with said first video signal.

5. The system of claim 1, wherein one of said field type control signals delays writing fields of said first field type by one horizontal line period.

6. The system of claim 1, wherein one of said field type control signals advances writing fields of said second field type by one horizontal line period.

7. The system of claim 1, wherein a first field type control signal delays writing fields of said first field type by one horizontal line period, a second field type control signal advances writing fields of said second field type by one horizontal line period and a third field type control signal maintains a current field type.

8. The system of claim 1, wherein said means for generating said test signals is responsive to an edge of said field type indicating output for said first video signal.

9. The system of claim 1, wherein said field type control signals are interlace correction signals, each being appropriate for a different mode of interlace control.

10. A field type matching system, comprising:
first and second field type detecting means for first and second video signals respectively, each of said detecting means having an output indicating whether said respective video signal has a first or second field type;
means responsive to said second field type detecting means for generating test signals indicative of different field type relationships between said first and second signals;
means for generating an output indicative of a relationship between said field type of said first video signal and at least one of said test signals; and,
means responsive to said relationship indicative output for controlling said field type of said second video signal to match said field type of said first video signal.

11. The system of claim 10, wherein said field type changing means comprises:
means for generating control signals for changing and maintaining said field type of said second video signal;
means for selecting one of said field type control signals.

12. The system of claim 10, further comprising means for synchronizing said second video signal with said first video signal for a combined display.

13. The system of claim 12, wherein said synchronizing means comprises means for storing said second video signal, said second video signal being written into said storing means synchronously with said second video signal and being read out of said storing means synchronously with said first video signal.

14. The system of claim 12, wherein said synchronizing means comprises:
a synchronous field memory, having write and read ports operable synchronously with said second video signal; and,
an asynchronous multiple line memory for data read from said field memory, having a write port operable synchronously with said second video signal and a read port operable synchronously with said first video signal.

15. The system of claim 10, wherein one of said field type control signals delays writing fields of said first field type by one horizontal line period.

16. The system of claim 10, wherein one of said field type control signals advances writing fields of said second field type by one horizontal line period.

17. The system of claim 10, wherein a first field type control signal delays writing fields of said first field type by one horizontal line period, a second field type control signal advances writing fields of said second field type by one horizontal line period and a third field type control signal maintains a current field type.

18. The system of claim 10, wherein said comparing means is responsive to an edge of said field type indicating output for said first video signal.

19. The system of claim 10, wherein said field type control signals are interlace correction signals, each being appropriate for a different mode of interlace control.

20. A field type matching system, comprising:
first and second field type detecting means for first and second video signals respectively, each of said detecting means having an output indicating whether said respective video signal has a first or second field type;
means for synchronizing said second video signal with said first video signal for a combined display
means responsive to said second field type detecting means for generating test signals indicative of different field type relationships between said first and second signals;
means for generating field type control signals for changing and maintaining said field type of said second video signal;
means for generating an output indicative of a relationship between said field type of said first video signal and at least one of said test signals; and,
means responsive to said relationship indicative output for selecting one of said field type control signals for controlling said field type of said second video signal to match said field type of said first video signal.

21. The system of claim 20, wherein said synchronizing means comprises:
a synchronous field memory, having write and read ports operable synchronously with said second video signal; and,
an asynchronous multiple line memory for data read from said field memory, having a write port operable synchronously with said second video signal and a read port operable synchronously with said first video signal.

22. The system of claim 20, wherein first field type control signal delays writing fields of said first field type by one horizontal line period, a second field type control signal advances writing fields of said second field type by one horizontal line period and a third field type control signal maintains a current field type.

23. The system of claim 20, wherein said field type control signals are interlace correction signals, each being appropriate for a different mode of interlace control.

24. A field type matching and synchronization system, comprising:
first and second field type detecting means for first and second video signals respectively, each having an output indicating whether said respective video signal has a first or second field type;
means for synchronizing said second video signal with said first video signal for a combined display;
means for comparing said field type of said second signal to said field type of said first signal and generating an output signal indicating one of a plurality of comparison outcomes;
means for successively generating a plurality of selectable interlace correction signals for each field type comparison, each of said correction signals being appropriate for one of said plurality of comparison outcomes; and, means responsive to said comparing means for selecting one of said interlace correction signals to control said field type of said second video signal to maintain interlace integrity of said first and second video signals in said combined display.

25. A field type matching system, comprising:

first and second field type detecting means for first and second video signals respectively, each of said detecting means having an output indicating whether said respective video signal has a first or second field type;

means for comparing said field types of said first and second video signals;

means for generating field type control signals for changing and maintaining said field type of said second video signal;

means responsive to said comparing means for selecting one of said field type control signals for controlling said field type of said second video signal to match said field type of said first video signal; and, a synchronous field memory and an asynchronous multiple line memory for synchronizing said second video signal with said first video signal for a combined display, said field memory having write and read ports operable synchronously with said second video signal and said asynchronous multiple line memory having a write port for data read from said field memory operable synchronously with said second video signal and a read port operable synchronously with said first video signal.

26. A field type matching system, comprising:

first and second field type detecting means for first and second video signals respectively, each of said detecting means having an output indicating whether said respective video signal has a first or second field type;

means for comparing said field types of said first and second video signals;

means for generating first, second and third field type control signals for changing and maintaining said field type of said second video signal; and, means responsive to said comparing means for selecting one of said field type control signals for controlling said field type of said second video signal to match said field type of said first video signal, said first field type control signal delaying writing fields of said first field type by one horizontal line period, said second field type control signal advancing writing fields of said second field type by one horizontal line period and said third field type control signal maintaining a current field type.

* * * * *